US012756102B2

(12) United States Patent
Fang et al.

(10) Patent No.: US 12,756,102 B2
(45) Date of Patent: Oct. 6, 2026

(54) ANTENNA

(71) Applicants: Beijing BOE Technology Development Co., Ltd., Beijing (CN); BOE Technology Group Co., Ltd., Beijing (CN)

(72) Inventors: Jia Fang, Beijing (CN); Feng Qu, Beijing (CN); Ying Ding, Beijing (CN)

(73) Assignees: Beijing BOE Technology Development Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 290 days.

(21) Appl. No.: 18/689,817

(22) PCT Filed: Jul. 11, 2023

(86) PCT No.: PCT/CN2023/106795

§ 371 (c)(1),
(2) Date: Mar. 6, 2024

(87) PCT Pub. No.: WO2025/010623

PCT Pub. Date: Jan. 16, 2025

(65) Prior Publication Data

US 2025/0226584 A1 Jul. 10, 2025

(51) Int. Cl.
*H01Q 9/04* (2006.01)
*H01Q 1/48* (2006.01)
*H01Q 3/36* (2006.01)

(52) U.S. Cl.
CPC ............... *H01Q 9/045* (2013.01); *H01Q 1/48* (2013.01); *H01Q 3/36* (2013.01); *H01Q 9/0414* (2013.01)

(58) Field of Classification Search
CPC ........ H01Q 1/38; H01Q 1/48; H01Q 3/34–36; H01Q 9/0414–0457; H01Q 21/065
See application file for complete search history.

(56) References Cited

U.S. PATENT DOCUMENTS 7,298,235 B2 * 11/2007 Hauhe ................ H01Q 21/0087 257/778
11,011,854 B2 * 5/2021 Haziza ................ H01Q 9/0442
(Continued)

FOREIGN PATENT DOCUMENTS

CN 108321504 A 7/2018
CN 111316500 A 6/2020
(Continued)

OTHER PUBLICATIONS

International Search Report & Written Opinion mailed Dec. 14, 2023, regarding PCT/CN2023/106795.

*Primary Examiner* — Hasan Islam
(74) *Attorney, Agent, or Firm* — Intellectual Valley Law, P.C.

(57) ABSTRACT

An antenna is provided. The antenna includes a feed line structure; a first low dielectric constant layer on the feed line structure; a first flexible layer on a side of the first low dielectric constant layer away from the feed line structure; a phase shifter on a side of the first flexible layer away from the first low dielectric constant layer; a first ground plate on a side of the phase shifter away from the first flexible layer; and a radiating plate on a side of the first ground plate away from the phase shifter. The first low dielectric constant layer has a dielectric constant in a range of 1.5 to 3. The first flexible layer has a Flexural modulus in a range of 0.01 to 10.0.

20 Claims, 13 Drawing Sheets

(56) References Cited

U.S. PATENT DOCUMENTS

| | | | | |
|---|---|---|---|---|
| 11,799,197 | B2 * | 10/2023 | Yang | H01Q 1/36 |
| 12,100,890 | B2 * | 9/2024 | Jia | H01Q 9/0414 |
| 2019/0123454 | A1 | 4/2019 | Haziza et al. | |

FOREIGN PATENT DOCUMENTS

| | | | |
|---|---|---|---|
| CN | 112510372 | A | 3/2021 |
| CN | 113659333 | A | 11/2021 |
| CN | 113991305 | A | 1/2022 |
| CN | 114267934 | A | 4/2022 |
| CN | 114335932 | A | 4/2022 |
| CN | 114696058 | A | 7/2022 |
| CN | 114914695 | A | 8/2022 |
| CN | 115036658 | A | 9/2022 |
| WO | 2022111170 | A1 | 6/2022 |
| WO | 2023073354 | A1 | 5/2023 |

* cited by examiner

ANTENNA

CROSS-REFERENCE TO RELATED APPLICATION

This application is a national stage application under 35 U.S.C. § 371 of International Application No. PCT/CN2023/106795, filed Jul. 11, 2023, the contents of which are incorporated by reference in the entirety.

TECHNICAL FIELD

The present invention relates to display technology, more particularly, to an antenna.

BACKGROUND

Millimeter wave antenna has been developed for the fifth generation (5G) mobile communication. For example, small cell base station technology has been developed to provide a solution to 5G communication coverage issue. Similarly, customer premise equipment technology has been developed to receive signals via millimeter wave. In these technologies, antenna, particularly millimeter wave antenna, plays a critical role.

SUMMARY

In one aspect, the present disclosure provides an antenna, comprising a feed line structure; a first low dielectric constant layer on the feed line structure; a first flexible layer on a side of the first low dielectric constant layer away from the feed line structure; a phase shifter on a side of the first flexible layer away from the first low dielectric constant layer; a first ground plate on a side of the phase shifter away from the first flexible layer; and a radiating plate on a side of the first ground plate away from the phase shifter; wherein the first low dielectric constant layer has a dielectric constant in a range of 1.5 to 3; and the first flexible layer has a Flexural modulus in a range of 0.01 to 10.0.

Optionally, the antenna further comprises a second flexible layer on a side of the phase shifter away from the first flexible layer; and a second low dielectric constant layer on a side of the second flexible layer away from the phase shifter; wherein the first ground plate is on a side of the second low dielectric constant layer away from the second flexible layer; the second low dielectric constant layer has a dielectric constant in a range of 1.5 to 3; and the second flexible layer has a Flexural modulus in a range of 0.01 to 10.0.

Optionally, the antenna further comprises a third flexible layer on a side of the first ground plate away from the phase shifter; and a third low dielectric constant layer on a side of the third flexible layer away from the first ground plate; wherein the radiating plate is on a side of the third low dielectric constant layer away from the third flexible layer; the third low dielectric constant layer has a dielectric constant in a range of 1.5 to 3; and the third flexible layer has a Flexural modulus in a range of 0.01 to 10.0.

Optionally, the antenna further comprises a fourth flexible layer on a side of the third low dielectric constant layer away from the third flexible layer; wherein the radiating plate is on a side of the fourth flexible layer away from the third low dielectric constant layer; and the fourth flexible layer has a Flexural modulus in a range of 0.01 to 10.0.

Optionally, the antenna further comprises a second ground plate on a side of the feed line structure away from the phase shifter; a fourth low dielectric constant layer on a side of the second ground plate away from the feed line structure; and a fifth flexible layer on a side of the fourth low dielectric constant layer away from the second ground plate; wherein the fourth low dielectric constant layer has a dielectric constant in a range of 1.5 to 3; and the fifth flexible layer has a Flexural modulus in a range of 0.01 to 10.0.

Optionally, the antenna further comprises a sixth flexible layer on a side of the second ground plate away from the feed line structure; wherein the sixth flexible layer has a Flexural modulus in a range of 0.01 to 10.0.

Optionally, the antenna further comprises a second ground plate on a side of the feed line structure away from the phase shifter; and an air layer and a spacer layer between the second ground plate and the feed line structure; wherein the air layer comprises a low dielectric constant gas; and the spacer layer comprises one or more spacers spacing apart the second ground plate and the feed line structure.

Optionally, the antenna further comprises a fifth flexible layer on a side of the feed line structure away from the second ground plate; a sixth flexible layer on a side of the second ground plate away from the feed line structure; and a fourth low dielectric constant layer on a side of the sixth flexible layer away from the second ground plate; wherein the fourth low dielectric constant layer has a dielectric constant in a range of 1.5 to 3; the fifth flexible layer has a Flexural modulus in a range of 0.01 to 10.0; and the sixth flexible layer has a Flexural modulus in a range of 0.01 to 10.0.

Optionally, the antenna further comprises a printed circuit board on a side of the feed line structure away from the phase shifter; and a second ground plate on a side of the printed circuit board away from the feed line structure; wherein the printed circuit board has a dielectric constant in a range of 1.5 to 3; and a thickness of the printed circuit board is in a range of 1 mm to ¼ of a dielectric wavelength of the printed circuit board.

Optionally, the feed line structure is a substrate integrated waveguide type feed line structure; wherein the feed line structure comprises a waveguide; the waveguide comprises a first metallic layer on a side of the first low dielectric constant layer away from the phase shifter, a substrate on a side of the first metallic layer away from the first low dielectric constant layer, a second metallic layer on a side of the substrate away from the first metallic layer, and a plurality of metallic vias extending through the substrate and connecting the first metallic layer and the second metallic layer; and the substrate has a dielectric constant in a range of 1.5 to 3.

Optionally, the waveguide further comprises an aperture extending through the first metallic layer; the phase shifter comprises a terminal portion; an orthographic projection of the terminal portion on the substrate at least partially overlaps with an orthographic projection of the aperture on the substrate; and the terminal portion is configured to transfer energy from the phase shifter to the feed line structure.

Optionally, the antenna further comprises a beamforming structure on a side of the first low dielectric constant layer away from the phase shifter; wherein an orthographic projection of the terminal portion on the substrate at least partially overlaps with an orthographic projection of the beamforming structure on the substrate; and the orthographic projection of the beamforming structure on the substrate at least partially overlaps with the orthographic projection of the aperture on the substrate.

Optionally, the antenna further comprises a base substrate; wherein the beamforming structure is on a side of the base substrate away from the aperture.

Optionally, the antenna further comprises a slot extending through at least one low dielectric constant layer.

Optionally, the antenna further comprises a first slot extending through the second low dielectric constant layer and the first ground plate; wherein an orthographic projection of the radiating plate on a base substrate at least partially overlaps with an orthographic projection of the first slot on the base substrate.

Optionally, the antenna further comprises a second slot extending through the third low dielectric constant layer; wherein an orthographic projection of the radiating plate on a base substrate at least partially overlaps with an orthographic projection of the second slot on the base substrate.

Optionally, the antenna further comprises a second low dielectric constant layer on a side of the phase shifter away from the feed line structure; a third low dielectric constant layer on a side of the first ground plate away from the second low dielectric constant layer; a first slot extending through the second low dielectric constant layer and the first ground plate; and a second slot extending through the third low dielectric constant layer; wherein an orthographic projection of the first slot on a base substrate at least partially overlaps with the orthographic projection of the second slot on the base substrate; and an orthographic projection of the radiating plate on the base substrate at least partially overlaps with the orthographic projection of the first slot on the base substrate, and at least partially overlaps with the orthographic projection of the second slot on the base substrate.

Optionally, the antenna further comprises a third flexible layer on a side of the first ground plate away from the phase shifter; wherein the first slot and the second slot are spaced apart by the third flexible layer.

Optionally, the feed line structure is made of a plastic substrate with a metallic material on a surface of the plastic substrate.

Optionally, the phase shifter comprises a plurality of phase shifter units; a respective phase shifter unit comprises a first electrode; a liquid crystal layer on the first electrode; a second electrode on a side of the liquid crystal layer away from the first electrode; a storage capacitor connected to the first electrode and/or the second electrode; and a ratio of a first resistivity of capacitor electrodes of the storage capacitor to a second resistivity of the first electrode and/or the second electrode is greater than 2.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Liquid crystal phased array antennas have a passive structure, thus controlling the link loss is important in the liquid crystal phases array antennas. In particular, the figure of merit (FoM) of the liquid crystal phase shifter in the antenna directly determines the architecture and efficiency of the antenna. In general, due to the low FoM of the liquid crystal phase shifter, waveguide structures are usually used to reduce the transmission loss of the non-phase shifter part, thereby improving the overall efficiency.

The inventors of the present disclosure discover that a liquid crystal phase shifter is essentially a transmission line, the effective dielectric constant during the electromagnetic wave transmission process is the average of the dielectric constants of the substrate and the liquid crystal. The inventors of the present disclosure discover that the dielectric constant of a related substrate (e.g., glass) in related antennas is usually large, and its thickness is at least five times that of the liquid crystal layer. As a result, the adjustable range of the effective dielectric constant is small. Moreover, the dielectric loss of the related substrate in related antennas is usually between 0.001 and 0.02, which requires a longer transmission line to achieve a phase shift of more than 360°. The high loss ultimately leads to a small FoM, The inventors of the present disclosure discover that, by using low-loss liquid crystal phase shifters in conjunction with a feed network structure resembling air-filled lines, the weight and profile height of the liquid crystal phased array can be significantly reduced.

Accordingly, the present disclosure provides, inter alia, an antenna that substantially obviate one or more of the problems due to limitations and disadvantages of the related art. In one aspect, the present disclosure provides an antenna. In some embodiments, the antenna includes a feed line structure; a first low dielectric constant layer on the feed line structure; a first flexible layer on a side of the first low dielectric constant layer away from the feed line structure; a phase shifter on a side of the first flexible layer away from the first low dielectric constant layer; a first ground plate on a side of the phase shifter away from the first flexible layer; and a radiating plate on a side of the first ground plate away from the phase shifter. Optionally, the first low dielectric constant layer has a dielectric constant in a range of 1.5 to 3. Optionally, the first flexible layer has a Flexural modulus in a range of 0.01 to 10.0.

Figure 1:
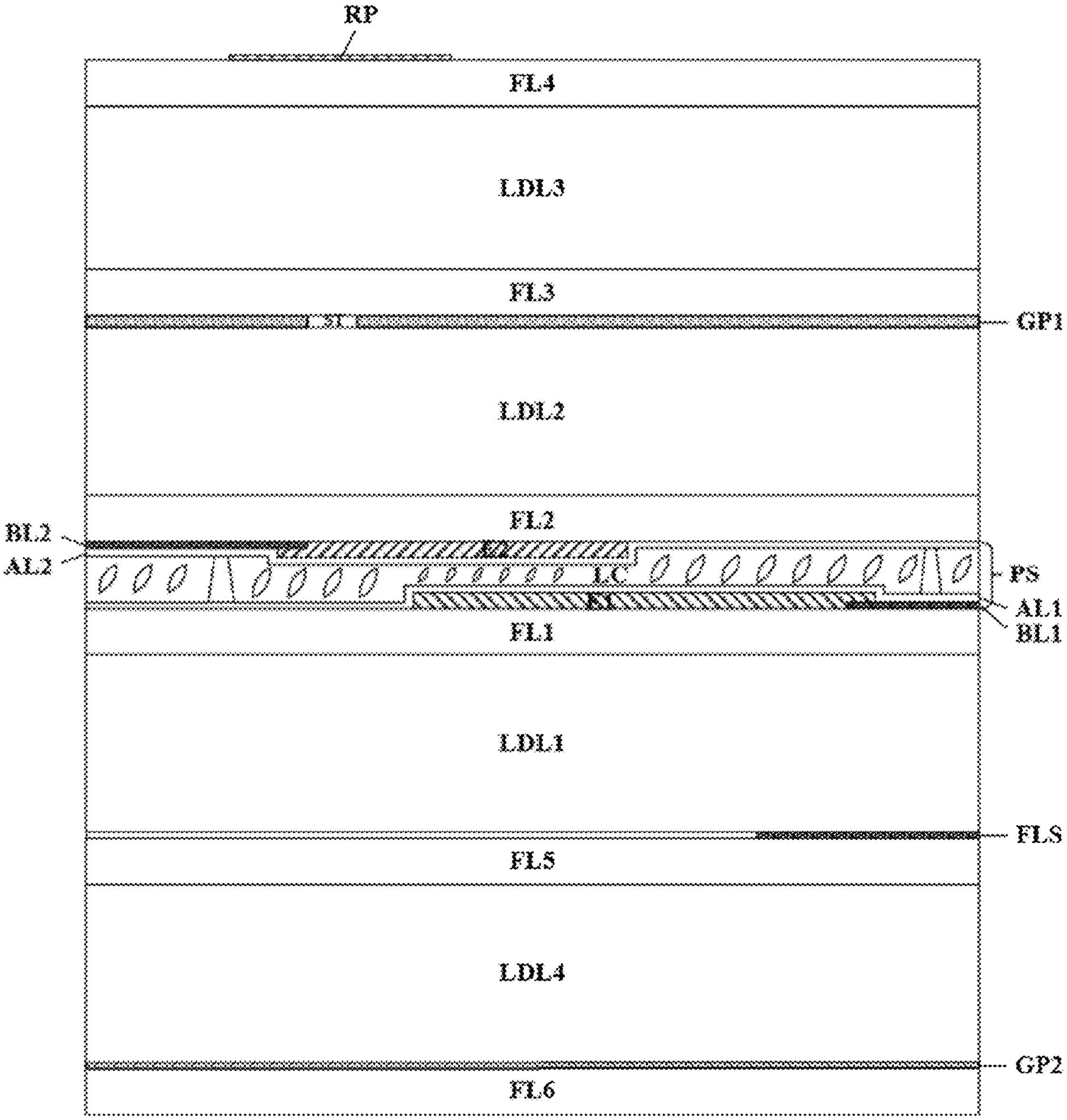
FIG. 1 is a diagram illustrating the structure of an antenna in some embodiments according to the present disclosure.

FIG. 1 is a diagram illustrating the structure of an antenna in some embodiments according to the present disclosure. Referring to FIG. 1, the antenna in some embodiments includes a feed line structure FLS, a first low dielectric constant layer LDL1 on the feed line structure FLS, a first flexible layer FL1 on a side of the first low dielectric constant layer LDL1 away from the feed line structure FLS, a phase shifter PS on a side of the first flexible layer FL1 away from the first low dielectric constant layer LDL1, a first ground plate GP1 on a side of the phase shifter PS away from the first flexible layer FL1, and a radiating plate RP on a side of the first ground plate GP1 away from the phase shifter PS.

The feed line structure FLS is a structure configured to transmit and/or receive electromagnetic signals. The phase shifter PS is configured to adjust the phase of an input signal, e.g., from the feed line structure FLS. The phase shifter PS typically includes active and/or passive components that introduce a controlled phase shift to the signal passing through it. The radiating plate RP is configured to generate or receive electromagnetic waves. The first ground plate GP1 is configured as a conductive reference plane for the phase shifter. The first ground plate GP1 provides a stable ground reference and is often used to form the opposing plate to the radiating plate RP.

In some embodiments, the antenna further includes a slot ST extending through the first ground plate GP1. The slot ST is configured to couple electromagnetic energy. The slot ST can be used as part of a coupling mechanism in the antenna.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

The phase shifter PS is configured to introduce a controlled phase shift to the signal. The phase shift can be adjusted based on the desired antenna characteristics or beamforming requirements. Various appropriate phase shifters may be implemented in the present disclosure. In one example, the phase shifter PS is an active phase shifter. An active phase shifter usually employs active electronic components, such as transistors or diodes, to actively control the phase of the signal. It can be electronically adjusted, allowing for real-time and dynamic control of the phase shift. In another example, the phase shifter PS is passive phase shifter, A passive phase shifter utilizes passive components, such as transmission lines or reactive elements, to introduce the phase shift. The phase shift value is typically fixed and determined by the design and characteristics of the passive components. By adjusting the phase shift introduced by the phase shifter PS, the radiating plate RP can control the direction of the radiated beam (e.g., beam steering). By changing the phase distribution across the radiating elements, the antenna can steer the main beam in a specific direction. In addition to beam steering, multiple radiating elements can be combined using specific phase shifts to create a desired radiation pattern or achieve beamforming. By adjusting the phase of each radiating element, constructive or destructive interference can be achieved, shaping the radiation pattern according to specific requirements. The purpose of the phase shifter PS is to modify the phase of the signal before it reaches the radiating plate RP. This allows for control over the direction. shape, and characteristics of the radiated beam. By adjusting the phase shift, the antenna can achieve beam steering, beamforming, or other desired antenna characteristics, enabling applications such as directionally focused transmissions, signal reception from specific directions, or interference nulling.

In some embodiments, the phase shifter PS is a liquid crystal phase shifter. In some embodiments, the phase shifter PS includes a first electrode E1 and a first bias line BL1 on the first flexible layer FL1, a liquid crystal layer LC on a side of the first electrode E1 and the first bias line BL1 away from the first flexible layer FL1, and a second electrode E2 and a second bias line BL2 on a side of the liquid crystal layer LC away from the first electrode E1 and the first bias line BL1. Optionally, the phase shifter PS further includes a first alignment layer AL1 and a second alignment layer AL2 on two opposite sides of the liquid crystal layer LC.

In some embodiments, the first electrode E1 and the second electrode B2 are configured to effective control and modulation of the phase of electromagnetic signals. In some embodiments, one of the first electrode E1 and the second electrode E2 is configured to apply an electric field across the liquid crystal layer LC. This electric field induces changes in the refractive index of the liquid crystal material, which in turn alters the phase of the transmitted electromagnetic waves. By adjusting the voltage applied to the electrode, the phase shift of the waves passing through the liquid crystal layer LC can be precisely controlled. In some embodiments, the other one of the first electrode E1 and the second electrode E2 is configured to serve as a ground plane and help maintain a stable electric field distribution within the liquid crystal layer LC. It provides a reference potential to ensure uniform and reliable modulation of the phase. The first electrode E1 and the second electrode E2 in combination create an electric field that allows for precise control of the liquid crystal's optical properties and, consequently, the phase shift of the transmitted electromagnetic waves.

Optionally, the first bias line BL1 is configured to transmit a first bias voltage to the first electrode E1, and the second bias line BL2 is configured to transmit a second bias voltage to the second electrode E2.

Optionally, the first alignment layer AL1 and the second alignment layer AL2 are configured to assist in controlling the orientation and alignment of the liquid crystal molecules, ensuring uniform and consistent behavior of the liquid crystal layer.

In some embodiments, the antenna further includes a second flexible layer FL2 on a side of the phase shifter PS away from the first flexible layer FL1, a second low dielectric constant layer LDL2 on a side of the second flexible layer FL2 away from the phase shifter PS. The first ground plate GP1 is on a side of the second low dielectric constant layer LDL2 away from the second flexible layer FL2.

The inventors of the present disclosure discover that by having a second low dielectric constant layer LDL2, particularly a combination of a second flexible layer FL2 and the second low dielectric constant layer LDL2, between the phase shifter PS and the first ground plate GP1, the antenna of the present disclosure surprisingly and unexpectedly achieves low loss, resulting in higher efficiency and broader bandwidth.

In some embodiments, the antenna further includes a third flexible layer FL3 on a side of the first ground plate GP1 away from the phase shifter PS, a third low dielectric constant layer LDL3 on a side of the third flexible layer FL3 away from the first ground plate GP1, and a fourth flexible layer FL4 on a side of the third low dielectric constant layer LDL3 away from the third flexible layer FL3. The radiating plate RP is on a side of the fourth flexible layer FLA away from the third low dielectric constant layer LDL3.

The inventors of the present disclosure discover that by having a third low dielectric constant layer LDL3, particularly a combination of a third flexible layer FL3, the third low dielectric constant layer LDL3, and optionally a fourth flexible layer FL4, between the first ground plate GP1 and the radiating plate RP, the antenna of the present disclosure surprisingly and unexpectedly achieves low loss, resulting in higher efficiency and broader bandwidth.

In some embodiments, the antenna further includes a second ground plate GP2 on a side of the feed line structure FLS away from the phase shifter PS. The second ground plate GP2 serves as a reference point, and is configured to provide a stable electrical potential against which the electromagnetic fields in the structure are measured and controlled. By defining a reference point, the ground plate helps ensure consistent and reliable operation of the antenna. The second ground plate GP2 is typically connected to the ground or a common reference point in the system. This connection serves to ground the antenna structure, reducing the impact of external electrical noise, interference, and static charges. Grounding helps maintain signal integrity, minimize unwanted signal reflections, and enhance the overall performance and efficiency of the antenna. Optionally, the second ground plate GP2 serves as a shield, and is configured to protect the antenna from external electromagnetic interference and reduce the emission of unwanted radiation in certain directions. This shielding capability helps maintain the antenna's desired radiation pattern and minimizes the impact on nearby electronic devices or systems.

In some embodiments, the antenna further includes a fourth low dielectric constant layer LDL4 on the second ground plate GP2 and a fifth flexible layer FLS on a side of the fourth low dielectric constant layer LDL4 away from the second ground plate GP2.

The inventors of the present disclosure discover that by having a fourth low dielectric constant layer LDL4, particularly a combination of a fifth flexible layer FL5 and the fourth low dielectric constant layer LDL4, between the feed line structure FLS and the second ground plate GP2, the antenna of the present disclosure surprisingly and unexpectedly achieves low loss, resulting in higher efficiency and broader bandwidth.

In some embodiments, the antenna further includes a sixth flexible layer FL6 on a side of the second ground plate GP2 away from the feed line structure FLS.

In some embodiments, the low dielectric constant layers (e.g., the first low dielectric constant layer LDL1, the second low dielectric constant layer LDL2, the third low dielectric constant layer LDL3, and/or the fourth low dielectric constant layer LDL4) have a dielectric constant in a range of 1.5 to 3, e.g., 1.5 to 1.6, 1.6 to 1.7, 1.7 to 1.8, 1.8 to 1.9, 1.9 to 2.0, 2.0 to 2.1, 2.1 to 2.2, 2.2 to 2.3, 2.3 to 2.4, 2.4 to 2.5, 2.5 to 2.6, 2.6 to 2.7, 2.7 to 2.8, 2.8 to 2.9, or 2.9 to 3.0. Various appropriate low dielectric constant materials may be used for making the low dielectric constant layers (e.g., the first low dielectric constant layer LDL1, the second low dielectric constant layer LDL2, the third low dielectric constant layer LDL3, and/or the fourth low dielectric constant layer LDL4). Examples of appropriate low dielectric constant materials for making the low dielectric constant layers include polymethyl methacrylimide (PMI, having a dielectric constant in a range of 2 to 3), polytetrafluoroethylene (typically having a dielectric constant around 2.1), polyetheretherketone (typically having a dielectric constant in a range of 2.8 to 3.3), liquid crystal polymer (typically having a dielectric constant in a range of 2.8 to 3.2), polystyrene (typically having a dielectric constant in a range of 2.5 to 2.6), polyethylene (typically having a dielectric constant in a range of 2.2 to 2.4), low-density polyethylene (typically having a dielectric constant in a range of 1.9 to 2.3), and polytetrafluoroethylene (typically having a dielectric constant around 2.1), In one example, the low dielectric constant layers are made of polymethyl methacrylimide.

In some embodiments, the flexible layers (e.g., the first flexible layer FL1, the second flexible layer FL2, the third flexible layer FL3, the fourth flexible layer FL4, the fifth flexible layer FLS, and/or the sixth flexible layer FL6) have a Flexural modulus in a range of 0.01 to 10.0, e.g., 0.01 to 0.05, 0.05 to 0.1, 0.1 to 0.2, 0.2 to 0.3, 0.3 to 0.4, 0.4 to 0.5, 0.5 to 0.6, 0.6 to 0.7, 0.7 to 0.8, 0.8 to 0.9, 0.9 to 1.0, 1.0 to 1.5, 1.5 to 2.0, 2.0 to 2.5, 2.5 to 3.0, 3.0 to 3.5, 3.5 to 4.0, 4.0 to 4.5, 4.5 to 5.0, 5.0 to 5.5, 5.5 to 6.0, 6.0 to 6.5, 6.5 to 7.0, 7.0 to 7.5, 7.5 to 8.0, 8.0 to 8.5, 8.5 to 9.0, 9.0 to 9.5, or 9.5 to 10.0. Various appropriate flexible materials may be used for making the flexible layers (e.g., the first flexible layer FL1, the second flexible layer FL2, the third flexible layer FL3, the fourth flexible layer FL4, the fifth flexible layer FL5, and/or the sixth flexible layer FL6). Examples of appropriate flexible materials for making the flexible layers includes polyimide (having a Flexural modulus in a range of 2.0 to 4.0 (Pa), polymethyl methacrylate (having a Flexural modulus in a range of 2.5 to 3.5 GPa), polyethylene terephthalate (having a Flexural modulus in a range of 2.0 to 4.0 GPa), polyethylene naphthalate (having a Flexural modulus in a range of 4.0 to 6.0 GPa), polyvinyl chloride (having a Flexural modulus in a range of 2.0 to 4.0 GPa), polyurethane (having a Flexural modulus in a range of 0.5 to 10.0 GPa), or polydimethylsiloxane (having a Flexural modulus in) a range of 0.01 to 0.5 GPa).

In some embodiments, a ratio of a first thickness of a low dielectric constant layer (e.g., the first low dielectric constant layer LDL1, the second low dielectric constant layer LDL2, the third low dielectric constant layer LDL3, or the fourth low dielectric constant layer LDL4) to a second thickness of a flexible layer (e.g., the first flexible layer FL1, the second flexible layer FL2, the third flexible layer FL3, the fourth flexible layer FL4, the fifth flexible layer FLS, or the sixth flexible layer FL6) is greater than 2:1, e.g., greater than 3:1, greater than 4:1, greater than 5:1, greater than 6:1, greater than 7:1, greater than 8:1, greater than 9:1, greater than 10:1, greater than 11:1, greater than 12:1, greater than 13:1, greater than 14:1, greater than 15:1, greater than 16:1, greater than 17:1, greater than 18:1, greater than 19:1, greater than 20:1, greater than 21:1, greater than 22:1, greater than 23:1, greater than 24:1, greater than 25:1, greater than 26:1, greater than 27:1, greater than 28:1, greater than 29:1, greater than 30:1, greater than 31:1, greater than 32:1, greater than 33:1, greater than 34:1, greater than 35:1, greater than 36:1, greater than 37:1, greater than 38:1, greater than 39:1, greater than 40:1, greater than 41:1, greater than 42:1, greater than 43:1, greater than 44:1, greater than 45:1, greater than 46:1, greater than 47:1, greater than 48:1, greater than 49:1, greater than 50:1, greater than 51:1, greater than 52:1, greater than 53:1, greater than 54:1, greater than 55:1, greater than 56:1, greater than 57:1, greater than 58:1, greater than 59:1, greater than 60:1, greater than 61:1, greater than 62:1, greater than 63:1, greater than 64:1, greater than 65:1, greater than 66:1, greater than 67:1, greater than 68:1, greater than 69:1, greater than 70:1, greater than 71:1, greater than 72:1, greater than 73:1, greater than 74:1, greater than 75:1, greater than 76:1, greater than 77:1, greater than 78:1, greater than 79:1, greater than 80:1, greater than 81:1, greater than 82:1, greater than 83:1, greater than 84:1, greater than 85:1, greater than 86:1, greater than 87:1, greater than 88:1, greater than 89:1, greater than 90:1, greater than 91:1, greater than 92:1, greater than 93:1, greater than 94:1, greater than 95:1, greater than 96:1, greater than 97:1, greater than 98:1, greater than 99:1, or greater than 100:1.

In some embodiments, a thickness of a flexible layer (e.g., the first flexible layer FL1, the second flexible layer FL2, the third flexible layer FL3, the fourth flexible layer FL4, the fifth flexible layer FL5, or the sixth flexible layer FL6) is in a range of 1 μm to 20 μm, e.g., 1 μm to 2 μm, 2 μm to 3 μm, 3 μm to 4 μm, 4 μm to 5 μm, 5 μm to 6 μm, 6 μm to 7 μm, 7 μm to 8 μm, 8 μm to 9 μm, 9 μm to 10 μm, 10 μm to 11 μm, 11 μm to 12 μm, 12 μm to 13 μm, 13 μm to 14 μm, 14 μm to 15 μm, 15 μm to 16 μm, 16 μm to 17 μm, 17 μm to 18 μm, 18 μm to 19 μm, or 19 μm to 20 μm.

In some embodiments, the phase shifter PS is spaced apart from any adjacent conductive layer by at least one low dielectric constant layer and optionally at least one flexible layer. In one example, the phase shifter PS is spaced apart from the feed line structure by the first flexible layer FL1 and the first low dielectric constant layer LDL1. In another example, the phase shifter PS is spaced apart from the first ground plate GP1 by the second flexible layer FL2 and the second low dielectric constant layer LDL2. The inventors of the present disclosure discover that, by having this intricate structure, the antenna of the present disclosure surprisingly and unexpectedly achieves low loss, resulting in higher efficiency and broader bandwidth.

In some embodiments, the first ground plate GP1 is spaced apart from any adjacent conductive layer by at least one low dielectric constant layer and optionally at least one flexible layer. In one example, the first ground plate GP1 is spaced apart from the phase shifter PS by the second flexible layer FL2 and the second low dielectric constant layer LDL2, In another example, the first ground plate GP1 is spaced apart from the radiating plate RP by the third flexible layer FL3, the third low dielectric constant layer LDL3, and the fourth flexible layer FL4. The inventors of the present disclosure discover that, by having this intricate structure, the antenna of the present disclosure surprisingly and unexpectedly achieves low loss, resulting in higher efficiency and broader bandwidth.

In some embodiments, the feed line structure FLS is spaced apart from any adjacent conductive layer by at least one low dielectric constant layer and optionally at least one flexible layer. In one example, the feed line structure FLS is spaced apart from the phase shifter PS by the first flexible layer FL1 and the first low dielectric constant layer LDL1. In another example, the feed line structure FLS is spaced apart from the second ground plate GP2 by the fourth low dielectric constant layer LDL4 and the fifth flexible layer FL5. The inventors of the present disclosure discover that, by having this intricate structure, the antenna of the present disclosure surprisingly and unexpectedly achieves low loss, resulting in higher efficiency and broader bandwidth.

Various appropriate conductive materials may be used for making the ground plates (e.g., the first ground plate GP1 and/or the second ground plate GP2), Examples of appropriate conductive materials for making the ground plates includes low resistance, low loss metals or alloys such as copper, gold, and silver. For example, a conductive material may be deposited on the substrate by, e.g., sputtering or vapor deposition, and patterned by, e.g., lithography such as a wet etching process to form the ground plates.

Various appropriate conductive materials may be used for making the radiating plate RP. Examples of appropriate conductive materials for making the radiating plate RP includes low resistance, low loss metals or alloys such as copper, gold, and silver. For example, a conductive material may be deposited on the substrate by, e.g., sputtering or vapor deposition, and patterned by, e.g., lithography such as a wet etching process to form the radiating plates.

Various appropriate conductive materials may be used for making the bias lines (e.g. the first bias line BL1 and/or the second bias line BL2). Examples of appropriate conductive materials for making the bias lines include high resistance conductive material such as metal oxides (e.g., indium tin oxide). The metal oxides are substantially transparent materials. Moreover, the bias lines for the phase shifter PS may adopt interlayer transmission. For example, the bias current can be transmitted through metal wires embedded within the insulating layer, rather than using visible or surface conductors. The metal wires for interlayer transmission can be integrated between the insulating layers to provide the bias functionality without significantly affecting the appearance or transparency of the device.

Figure 2:
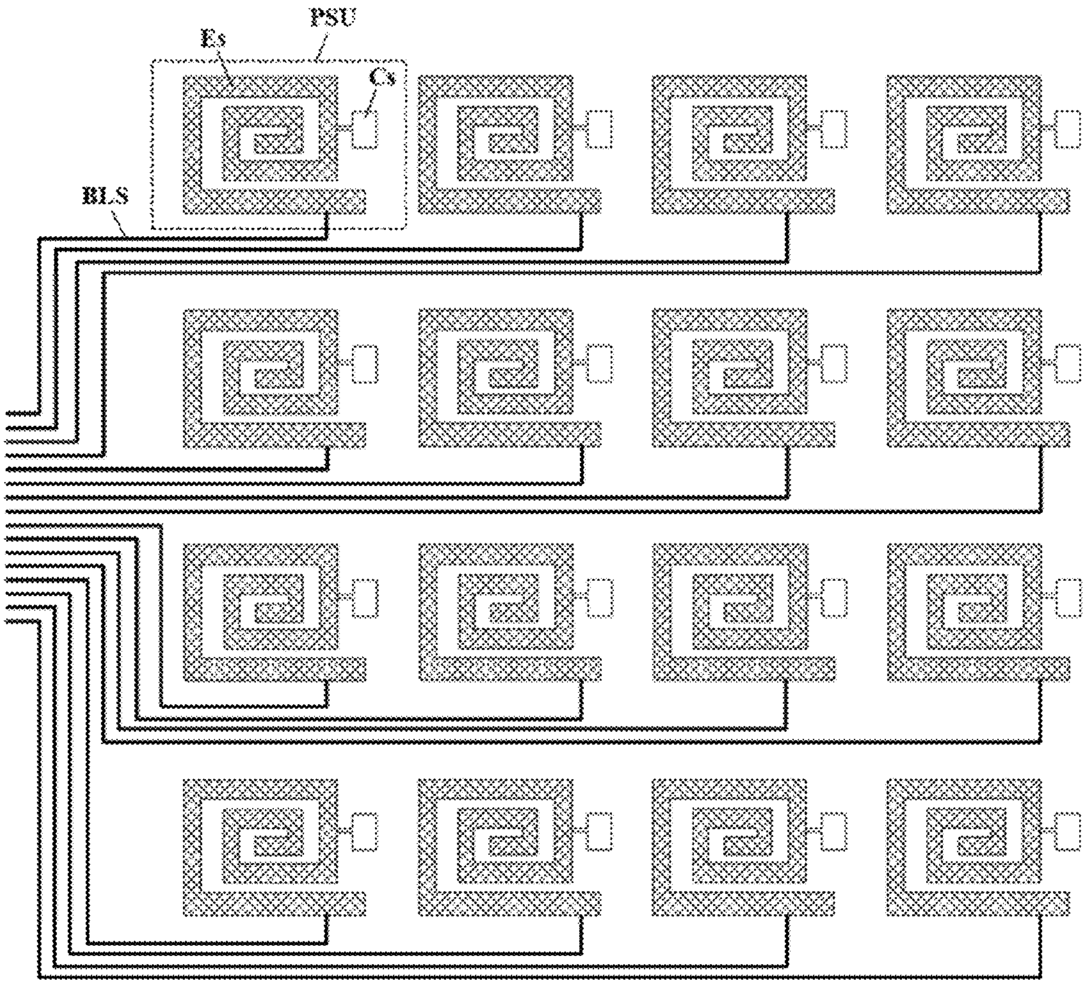
FIG. 2 is a diagram illustrating the structure of a passive matrix phase shifter in some embodiments according to the present disclosure.

Various appropriate phase shifters may be implemented in the present disclosure. Examples of appropriate phase shifters include passive matrix phase shifters and active matrix phase shifters. FIG. 2 is a diagram illustrating the structure of a passive matrix phase shifter in some embodiments according to the present disclosure. Referring to FIG. 2, the phase shifter in some embodiments includes a plurality of phase shifter units PSU and a plurality of bias lines BLS connected to the plurality of phase shifter units PSU, respectively. Optionally, a respective bias line of the plurality of bias lines BLS is connected to a respective phase shifter unit of the plurality of phase shifter units PSU.

In some embodiments, a respective phase shifter unit of the plurality of phase shifter units PSU includes one or more electrodes Es (e.g., a first electrode and a second electrode). The inventors of the present disclosure discover that, in the passive matrix phase shifter, the plurality of bias lines BLS for the plurality of phase shifter units PSU may overlap or cross over each other, particularly when the number of the plurality of phase shifter units PSU and the number of the plurality of bias lines BLS are relatively large. The inventors of the present disclosure discover that a storage capacitor is conducive to maintaining the state of the liquid crystal molecules in the liquid crystal phase shifter.

In some embodiments, a respective phase shifter unit of the plurality of phase shifter units PSU further includes a storage capacitor Cs connected to the one or more electrodes Es.

To minimize the impact of the storage capacitor Cs on microwave signal transmission, it is preferable to use materials with lower conductivity, such as conductive oxides, as the capacitor electrodes of the storage capacitor Cs and the plurality of bias lines BLS. In some embodiments, a ratio of a first resistivity of the capacitor electrodes of the storage capacitor Cs to a second resistivity of the one or more electrodes Es is greater than 2, e.g., greater than 5, greater than 10, greater than 20, greater than 30, greater than 40, greater than 50, greater than 60, greater than 70, greater than 80, greater than 90, greater than 100, greater than 110, greater than 120, greater than 130, greater than 140, greater than 150, greater than 160, greater than 170, greater than 180, greater than 190, greater than 200, greater than 300, greater than 400, greater than 500, greater than 600, greater than 700, greater than 800, greater than 900, or greater than 1000. In some embodiments, a ratio of a third resistivity of the plurality of bias lines BLS to a second resistivity of the one or more electrodes Es is greater than 2, e.g., greater than 5, greater than 10, greater than 20, greater than 30, greater than 40, greater than 50, greater than 60, greater than 70, greater than 80, greater than 90, greater than 100, greater than 110, greater than 120, greater than 130, greater than 140, greater than 150, greater than 160, greater than 170, greater than 180, greater than 190, greater than 200, greater than 300, greater than 400, greater than 500, greater than 600, greater than 700, greater than 800, greater than 900, or greater than 1000.

Figure 3:
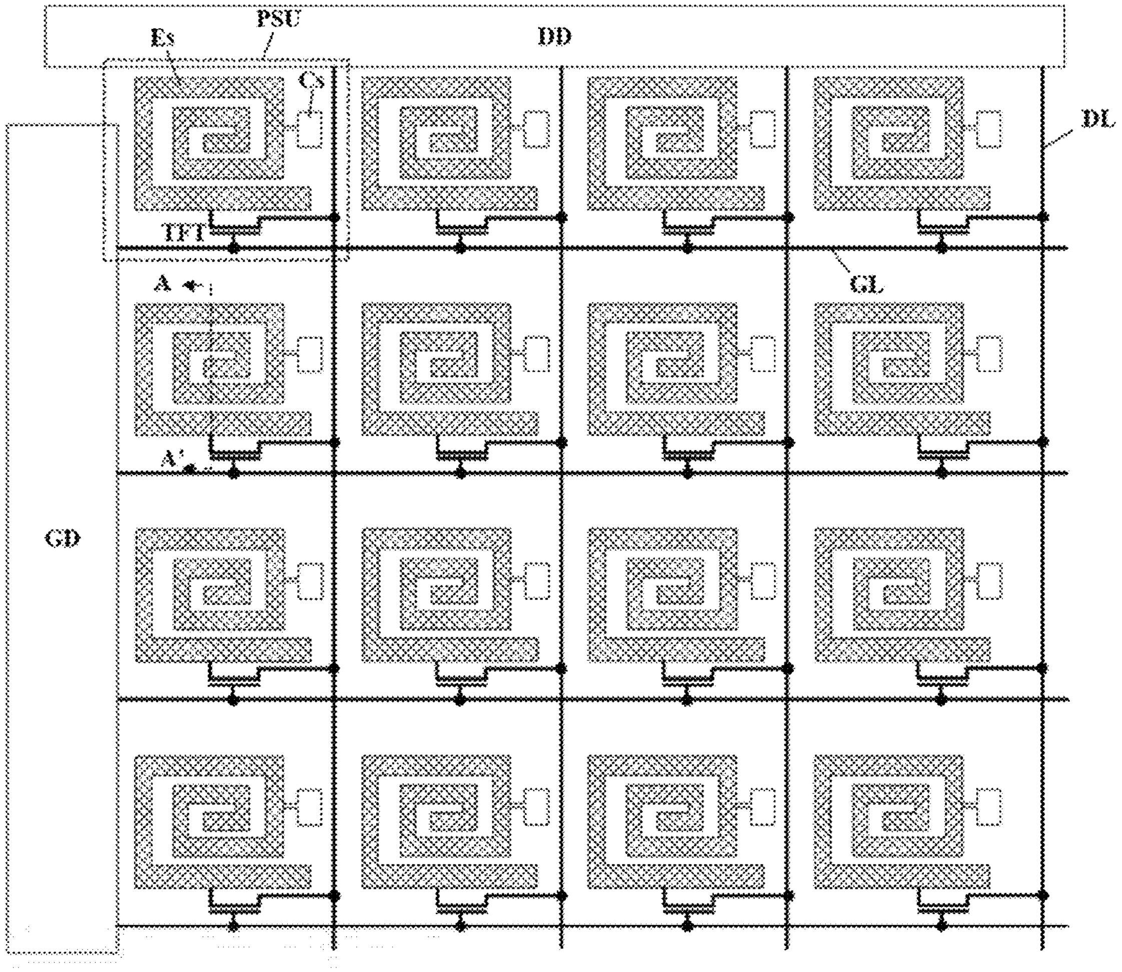
FIG. 3 is a diagram illustrating the structure of an active matrix phase shifter in some embodiments according to the present disclosure.
Figure 4:
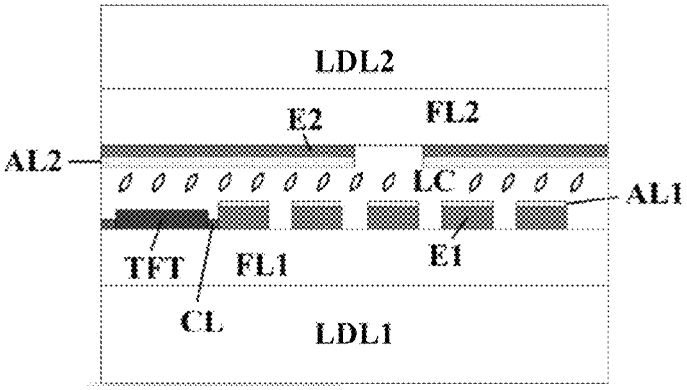
FIG. 4 is a cross-sectional view along an A-A' line in FIG. 3.

FIG. 3 is a diagram illustrating the structure of an active matrix phase shifter in some embodiments according to the present disclosure. FIG. 4 is a cross-sectional view along an A-A' line in FIG. 3. Referring to FIG. 3 and FIG. 4, the phase shifter in some embodiments includes a plurality of phase shifter units PSU. Optionally, a respective phase shifter unit of the plurality of phase shifter units PSU includes one or more electrodes Es (e.g., a first electrode and a second electrode) and a transistor TFT. The phase shifter in some embodiments further includes a plurality of data lines DL and a plurality of gate lines GL. A gate electrode of the transistor TFT is connected to a respective gate line of the plurality of gate lines GL, a first electrode of the transistor TFT is connected to a respective data line of the plurality of data lines DL. The plurality of data lines DL are connected to a data driver DD. The plurality of gate lines GL are connected to a gate driver GD.

In some embodiments, the respective phase shifter unit of the plurality of phase shifter units PSU further includes a storage capacitor Cs connected to the one or more electrodes Es.

To minimize the impact of the storage capacitor Cs on microwave signal transmission, it is preferable to use materials with lower conductivity, such as conductive oxides, as the capacitor electrodes of the storage capacitor Cs. In some embodiments, a ratio of a first resistivity of the capacitor electrodes of the storage capacitor Cs to a second resistivity of the one or more electrodes Es is greater than 2, e.g., greater than 5, greater than 10, greater than 20, greater than 30, greater than 40, greater than 50, greater than 60, greater than 70, greater than 80, greater than 90, greater than 100, greater than 110, greater than 120, greater than 130, greater than 140, greater than 150, greater than 160, greater than 170, greater than 180, greater than 190, greater than 200, greater than 300, greater than 400, greater than 500, greater than 600, greater than 700, greater than 800, greater than 900, or greater than 1000.

Various appropriate thin film transistors may be implemented in the present disclosure, Examples of appropriate thin film transistors include metal oxide transistors (e.g., a transistor having an indium gallium zinc oxide channel), low temperature silicon transistors, low temperature polysilicon transistors. Optionally, the active layer of the transistor TFT is made of a semiconductor material having a relative high mobility rate. A relatively high mobility rate is conducive to improving the charging speed of liquid crystal phase shifter units, thereby potentially enhancing the response time of the phase shifter.

Referring to FIG. 3 and FIG. 4, the phase shifter in some embodiments further includes a connecting line CL connecting a second electrode of the transistor TFT to the one or more electrodes Es. The inventors of the present disclosure discover that a contact area between the connecting line CL and the one or more electrodes Es should be sufficiently large to ensure connection.

FIG. SA illustrates a connection between a connecting line and one or more electrodes in some embodiments according to the present disclosure. Referring to FIG. SA, in some embodiments, an orthographic projection of the connecting line CL on a base substrate at least partially overlaps with an orthographic projection of the one or more electrodes Es on the base substrate. In some embodiments, a length of the connecting line CL in direct contact with the one or more electrode Es is greater than 5 μm to ensure connection.

Figure 5A:
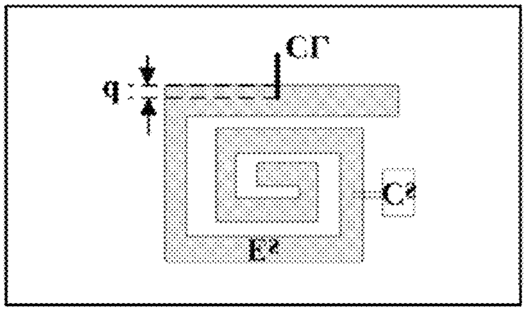
FIG. 5A illustrates a connection between a connecting line and one or more electrodes in some embodiments according to the present disclosure.
Figure 5B:
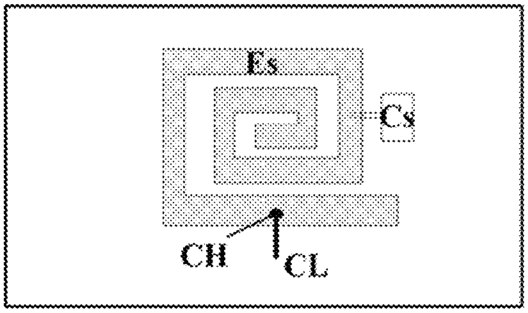
FIG. 5B illustrates a connection between a connecting line and one or more electrodes in some embodiments according to the present disclosure.
Figure 5C:
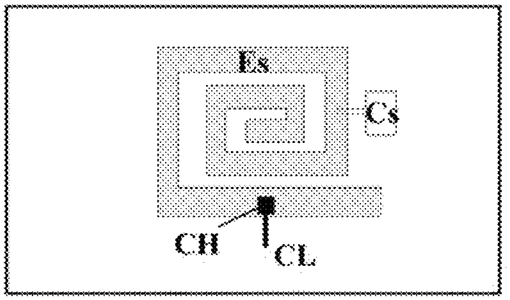
FIG. 5C illustrates a connection between a connecting line and one or more electrodes in some embodiments according to the present disclosure.

FIG. 5B illustrates a connection between a connecting line and one or more electrodes in some embodiments according to the present disclosure. FIG. 5C illustrates a connection between a connecting line and one or more electrodes in some embodiments according to the present disclosure. Referring to FIG. 5B and FIG. 5C, in some embodiments, the phase shifter further includes a connecting head portion CH connected to the connecting line CL and connected to the one or more electrode Es. A width of the connecting head portion CH is greater than an average line width of the connecting line CL, The connecting head portion CH increases the contact area with the one or more electrodes, ensuring connection. In one example depicted in FIG. 5B, the connecting head portion CH has a round shape. In another example depicted in FIG. 5C, the connecting head portion CH has a rectangular shape.

Figure 6:
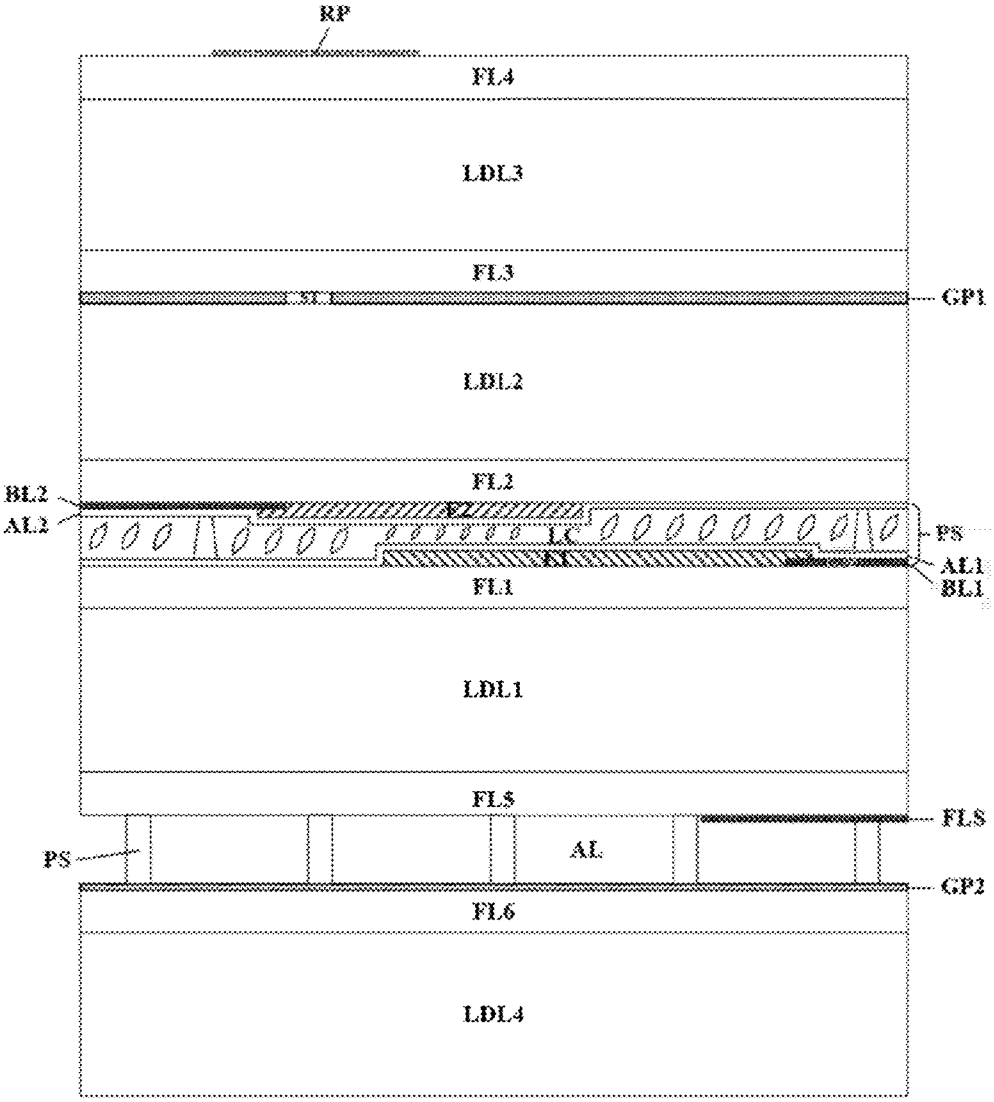
FIG. 6 is a diagram illustrating the structure of an antenna in some embodiments according to the present disclosure.

FIG. 6 is a diagram illustrating the structure of an antenna in some embodiments according to the present disclosure. Referring to FIG. 6, the antenna in some embodiments includes a feed line structure FLS, a first low dielectric constant layer LDL1 on the feed line structure FLS, a first flexible layer FL1 on a side of the first low dielectric constant layer LDL1 away from the feed line structure FLS, a phase shifter PS on a side of the first flexible layer FL1 away from the first low dielectric constant layer LDL1, a first ground plate GP1 on a side of the phase shifter PS away from the first flexible layer FL1, and a radiating plate RP on a side of the first ground plate GP1 away from the phase shifter PS. Optionally, the antenna further includes a slot ST extending through the first ground plate GP1. Optionally, the phase shifter PS is a liquid crystal phase shifter.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

In some embodiments, the antenna further includes a second flexible layer FL2 on a side of the phase shifter PS away from the first flexible layer FL1, a second low dielectric constant layer LDL2 on a side of the second flexible layer FL2 away from the phase shifter PS. The first ground plate GP1 is on a side of the second low dielectric constant layer LDL2 away from the second flexible layer FL2.

The inventors of the present disclosure discover that by having a second low dielectric constant layer LDL2, particularly a combination of a second flexible layer FL2 and the second low dielectric constant layer LDL2, between the phase shifter PS and the first ground plate GP1, the antenna of the present disclosure surprisingly and unexpectedly achieves low loss, resulting in higher efficiency and broader bandwidth.

In some embodiments, the antenna further includes a third flexible layer FL3 on a side of the first ground plate GP1 away from the phase shifter PS, a third low dielectric constant layer LDL3 on a side of the third flexible layer FL3 away from the first ground plate GP1, and a fourth flexible layer FL4 on a side of the third low dielectric constant layer LDL3 away from the third flexible layer FL3. The radiating plate RP is on a side of the fourth flexible layer FL4 away from the third low dielectric constant layer LDL3.

The inventors of the present disclosure discover that by having a third low dielectric constant layer LDL3, particularly a combination of a third flexible layer FL3, the third low dielectric constant layer LDL3, and optionally a fourth flexible layer FL4, between the first ground plate GP1 and the radiating plate RP, the antenna of the present disclosure surprisingly and unexpectedly achieves low loss, resulting in higher efficiency and broader bandwidth.

In some embodiments, the antenna further includes a second ground plate GP2 on a side of the feed line structure FLS away from the phase shifter PS.

In some embodiments, the antenna further includes an air layer AL and a spacer layer PS between the second ground plate GP2 and the feed line structure FLS. The air layer AL includes a low dielectric constant gas. Examples of low dielectric constant gases include air, nitrogen, helium, argon, hydrogen, and carbon dioxide. The spacer layer PS includes one or more spacers spacing apart the second ground plate GP2 and the feed line structure FLS. Various appropriate insulating materials may be used for making the one or more spacers. Examples of appropriate insulating materials for making the one or more spacers include low dielectric constant materials such as the ones for making the low dielectric constant layers.

In some embodiments, the antenna further includes a fifth flexible layer FLS on a side of the feed line structure FLS away from the second ground plate GP2. Optionally, the fifth flexible layer FL5 is in direct contact with the first low dielectric constant layer LDL1, in direct contact with the feed line structure FLS, and in direct contact with the spacer layer PS.

In some embodiments, the antenna further includes a sixth flexible layer FL6 on a side of the second ground plate GP2 away from the feed line structure FLS.

In some embodiments, the antenna further includes a fourth low dielectric constant layer LDL4 on a side of the sixth flexible layer FL6 away from the second ground plate GP2.

The inventors of the present disclosure discover that, by having the air layer AL with a dielectric constant approximately 1.0 between the feed line structure FLS and the second ground plate GP2, the loss for the feed line structure FLS can be significantly reduced.

Figure 7A:
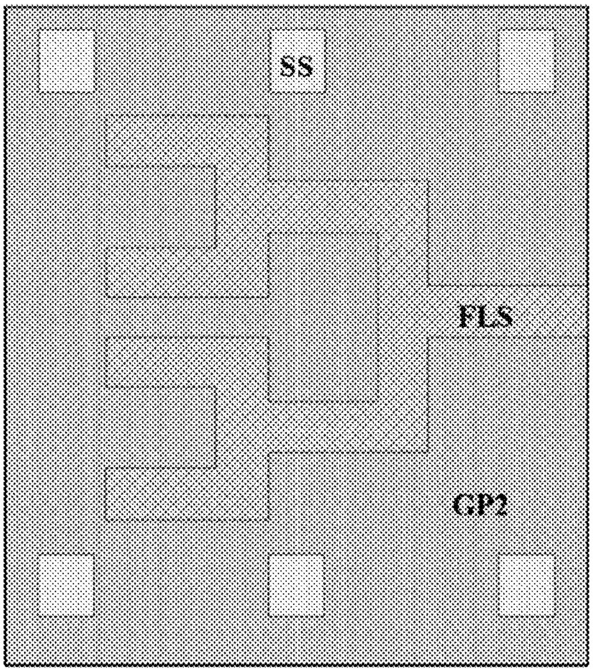
FIG. 7A is a plan view of a feed line structure, one or more spacers, and a second ground plate in some embodiments according to the present disclosure.

FIG. 7A is a plan view of a feed line structure, one or more spacers, and a second ground plate in some embodiments according to the present disclosure. Referring to FIG. 7A, the one or more spacers SS are spaced apart from each other. A number of spacers in the spacer layer is greater than 1. Optionally, an orthographic projection of the one or more spacers SS on the second ground plate GP2 is non-overlapping with an orthographic projection of the feed line structure FLS on the second ground plate GP2.

Figure 7B:
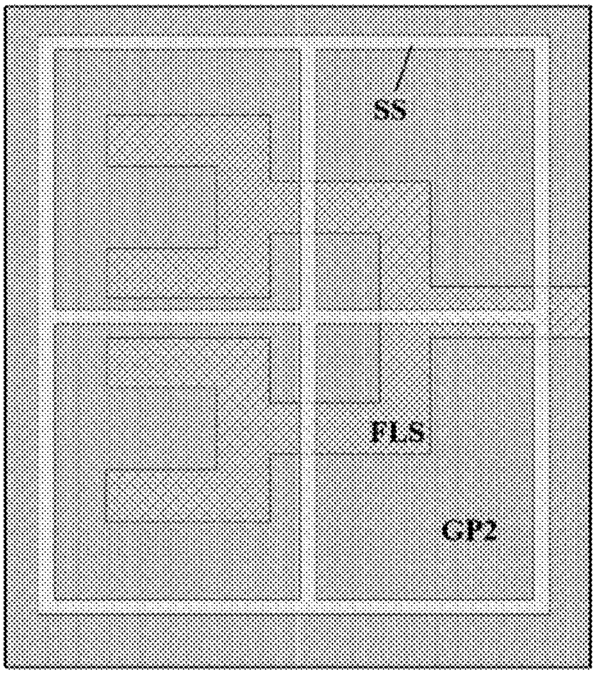
FIG. 7B is a plan view of a feed line structure, one or more spacers, and a second ground plate in some embodiments according to the present disclosure.

FIG. 7B is a plan view of a feed line structure, one or more spacers, and a second ground plate in some embodiments according to the present disclosure. Referring to FIG. 7B, in some embodiments, a number of spacers in the spacer layer is 1. The spacer layer includes a unitary structure including a plurality of horizontal bars and a plurality of vertical bars interconnected together. Optionally, an orthographic projection of the unitary structure on the second ground plate GP2 at least partially overlaps with an orthographic projection of the feed line structure FLS on the second ground plate GP2. Optionally, a layout between the unitary structure and the feed line structure FLS minimizes an overlapping area between the orthographic projection of the unitary structure and the orthographic projection of the feed line structure on the second ground plate GP2.

Figure 8:
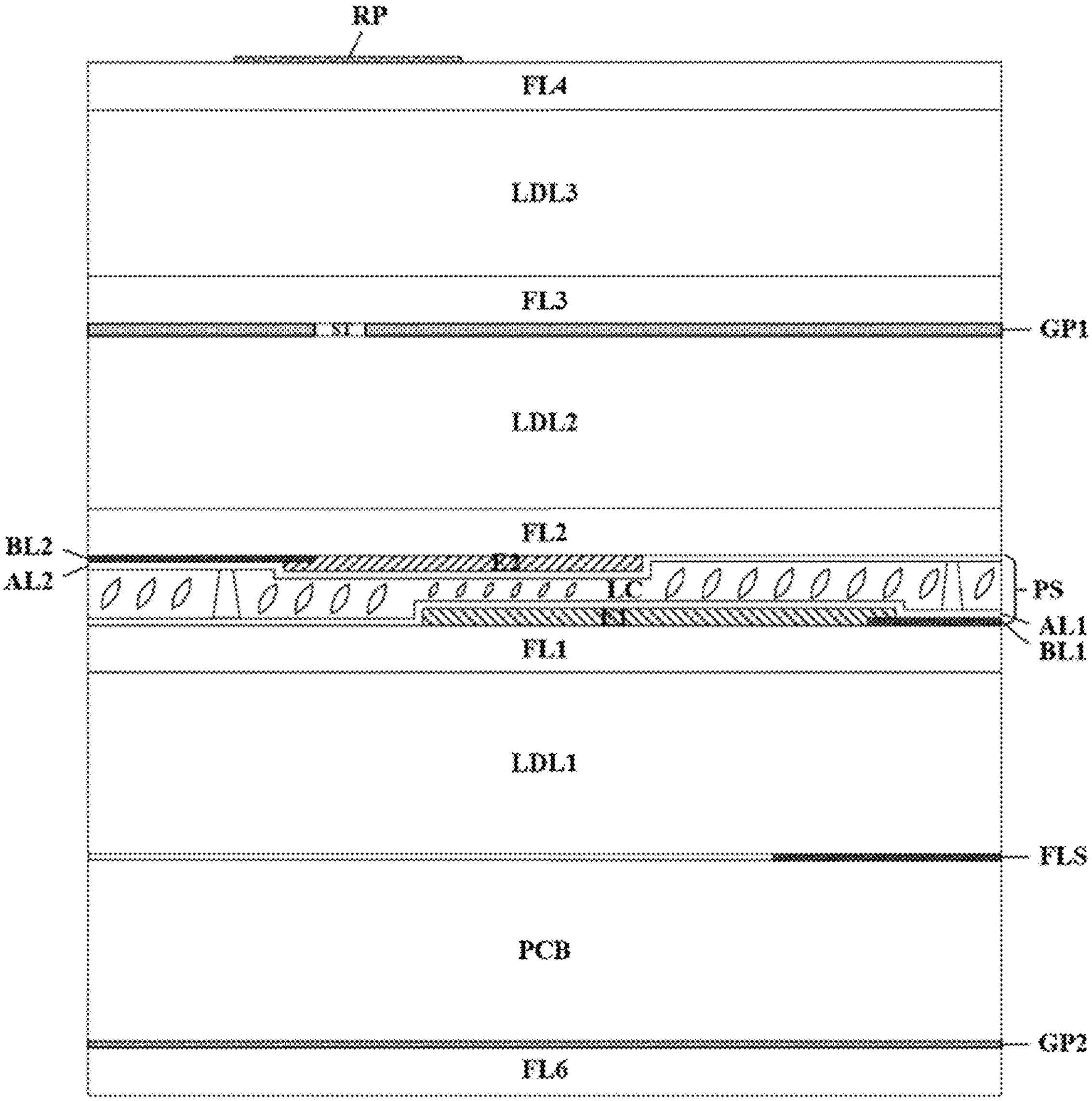
FIG. 8 is a diagram illustrating the structure of an antenna in some embodiments according to the present disclosure.

FIG. 8 is a diagram illustrating the structure of an antenna in some embodiments according to the present disclosure, Referring to FIG. 8, the antenna in some embodiments includes a feed line structure FLS, a first low dielectric constant layer LDL1 on the feed line structure FLS, a first flexible layer FL1 on a side of the first low dielectric constant layer LDL1 away from the feed line structure FLS, a phase shifter PS on a side of the first flexible layer FL1 away from the first low dielectric constant layer LDL1, a first ground plate GP1 on a side of the phase shifter PS away from the first flexible layer FL1, and a radiating plate RP on a side of the first ground plate GP1 away from the phase shifter PS. Optionally, the antenna further includes a slot ST extending through the first ground plate GP1. Optionally, the phase shifter PS is a liquid crystal phase shifter.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

In some embodiments, the antenna further includes a second flexible layer FL2 on a side of the phase shifter PS away from the first flexible layer FL1, a second low dielectric constant layer LDL2 on a side of the second flexible layer FL2 away from the phase shifter PS. The first ground plate GP1 is on a side of the second low dielectric constant layer LDL2 away from the second flexible layer FL2.

The inventors of the present disclosure discover that by having a second low dielectric constant layer LDL2, particularly a combination of a second flexible layer FL2 and the second low dielectric constant layer LDL2, between the phase shifter PS and the first ground plate GP1, the antenna of the present disclosure surprisingly and unexpectedly achieves low loss, resulting in higher efficiency and broader bandwidth.

In some embodiments, the antenna further includes a third flexible layer FL3 on a side of the first ground plate GP1 away from the phase shifter PS, a third low dielectric constant layer LDL3 on a side of the third flexible layer FL3 away from the first ground plate GP1, and a fourth flexible layer FL4 on a side of the third low dielectric constant layer LDL3 away from the third flexible layer FL3. The radiating plate RP is on a side of the fourth flexible layer FL4 away from the third low dielectric constant layer LDL3.

The inventors of the present disclosure discover that by having a third low dielectric constant layer LDL3, particularly a combination of a third flexible layer FL3, the third low dielectric constant layer LDL3, and optionally a fourth flexible layer FL4, between the first ground plate GP1 and the radiating plate RP, the antenna of the present disclosure surprisingly and unexpectedly achieves low loss, resulting in higher efficiency and broader bandwidth.

In some embodiments, the antenna further includes a second ground plate GP2 on a side of the feed line structure FLS away from the phase shifter PS.

In some embodiments, the antenna further includes a printed circuit board PCB between the feed line structure FLS and the second ground plate GP2. The printed circuit board PCB is on a side of the feed line structure FLS away from the phase shifter PS. Optionally, the printed circuit board PCB is in direct contact with the feed line structure FLS.

Various appropriate printed circuit boards may be used in the present disclosure. For example, Rogers 5880™ (Rogers Corporation) is a specific type of high-frequency laminated composite material often used in the construction of printed circuit boards for radiofrequency and microwave applications. Rogers 5880™ is designed to provide excellent electrical performance, low loss, and high-frequency signal integrity. Rogers 5880™ has a low dielectric constant of around 2.2, which helps minimize signal loss and impedance variations at high frequencies. Rogers 5880™ has a low loss tangent, indicating minimal energy dissipation and improved signal transmission. The inventors of the present disclosure discover that, when Rogers 5880™ is used, the loss is only approximately 0.0009. In one example, a thickness of the printed circuit board PCB is in a range of 1 mm to ¼ of a dielectric wavelength of the printed circuit board, further reducing transmission loss. The dielectric wavelength, also known as the electrical wavelength or wavelength in the dielectric, is a concept used in the analysis of electromagnetic waves propagating through a medium with a specific dielectric constant. It is a measure of the distance that an electromagnetic wave travels in the dielectric material during one complete cycle. When an electromagnetic wave passes from one medium to another, such as from air to a dielectric material like Rogers 5880™, its propagation characteristics can change due to the differences in the dielectric constants of the two mediums. The dielectric wavelength takes into account the effect of the dielectric constant on the wavelength of the wave.

In general, the dielectric wavelength can be calculated using the following formula:

$$\lambda\_d = \frac{\lambda\_0}{\sqrt{(\varepsilon\_r)}};$$

wherein λ_d stands for the dielectric wavelength; λ_0 stands for the free-space wavelength (wavelength in vacuum or air); and ε_r stands for the relative dielectric constant of the material. The dielectric wavelength is inversely proportional to the square root of the relative dielectric constant. This means that as the relative dielectric constant increases, the dielectric wavelength decreases.

Figure 9:
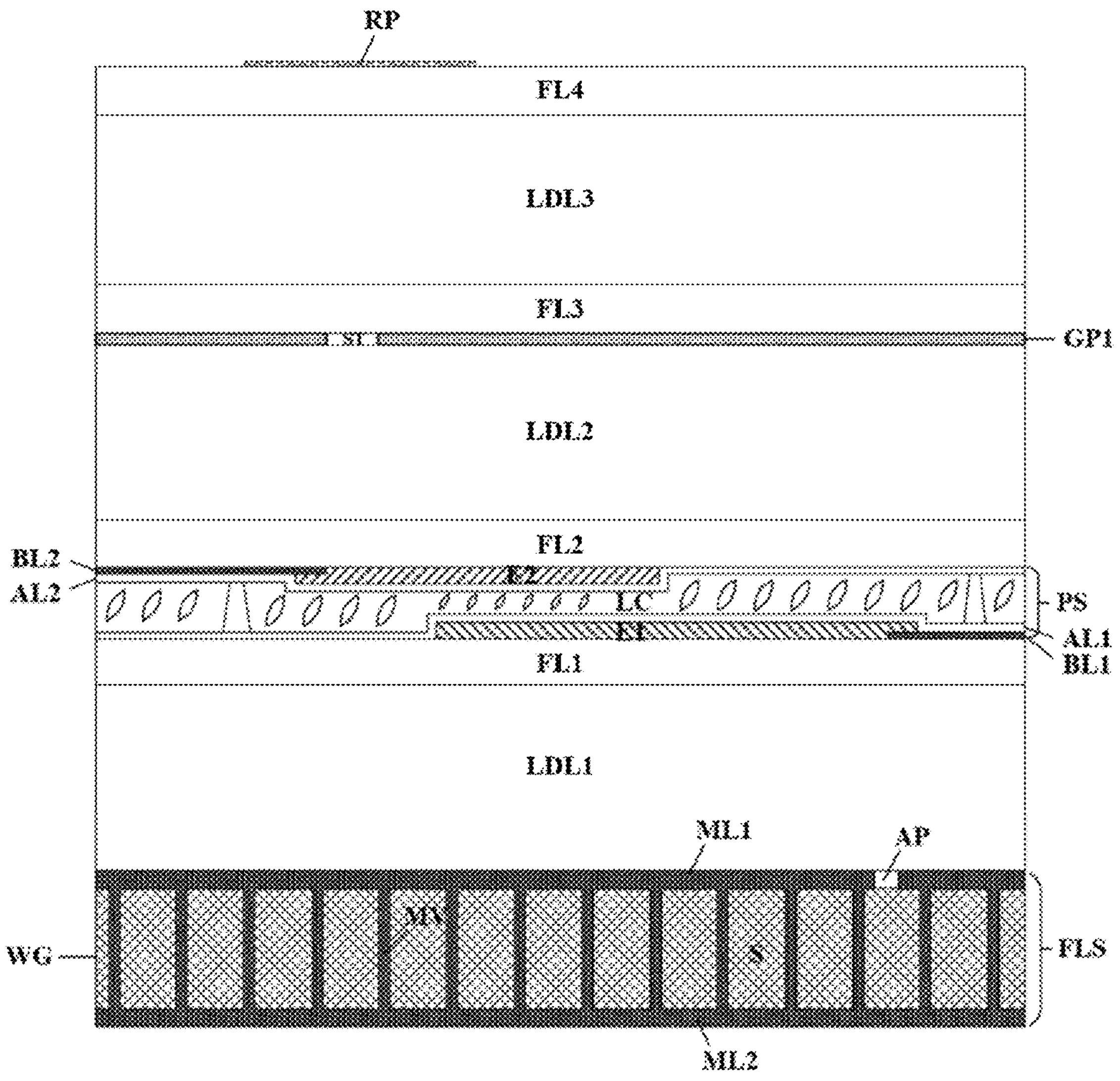
FIG. 9 is a diagram illustrating the structure of an antenna in some embodiments according to the present disclosure.

FIG. 9 is a diagram illustrating the structure of an antenna in some embodiments according to the present disclosure. Referring to FIG. 9, the antenna in some embodiments includes a feed line structure FLS, a first low dielectric constant layer LDL1 on the feed line structure FLS, a first flexible layer FL1 on a side of the first low dielectric constant layer LDL1 away from the feed line structure FLS, a phase shifter PS on a side of the first flexible layer FL1 away from the first low dielectric constant layer LDL1, a first ground plate GP1 on a side of the phase shifter PS away from the first flexible layer FL1, and a radiating plate RP on a side of the first ground plate GP1 away from the phase shifter PS.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

In some embodiments, the antenna further includes a second flexible layer FL2 on a side of the phase shifter PS away from the first flexible layer FL1, a second low dielectric constant layer LDL2 on a side of the second flexible layer FL2 away from the phase shifter PS. The first ground plate GP1 is on a side of the second low dielectric constant layer LDL2 away from the second flexible layer FL2.

The inventors of the present disclosure discover that by having a second low dielectric constant layer LDL2, particularly a combination of a second flexible layer FL2 and the second low dielectric constant layer LDL2, between the phase shifter PS and the first ground plate GP1, the antenna of the present disclosure surprisingly and unexpectedly achieves low loss, resulting in higher efficiency and broader bandwidth.

In some embodiments, the antenna further includes a third flexible layer FL3 on a side of the first ground plate GP1 away from the phase shifter PS, a third low dielectric constant layer LDL3 on a side of the third flexible layer FL3 away from the first ground plate GP1, and a fourth flexible layer FL4 on a side of the third low dielectric constant layer LDL3 away from the third flexible layer FL3. The radiating plate RP is on a side of the fourth flexible layer FL4 away from the third low dielectric constant layer LDL3.

The inventors of the present disclosure discover that by having a third low dielectric constant layer LDL3, particularly a combination of a third flexible layer FL3, the third low dielectric constant layer LDL3, and optionally a fourth flexible layer FL4, between the first ground plate GP1 and the radiating plate RP, the antenna of the present disclosure surprisingly and unexpectedly achieves low loss, resulting in higher efficiency and broader bandwidth.

In some embodiments, the feed line structure FLS is a substrate integrated waveguide type feed line structure. The substrate integrated waveguide type feed line structure is a type of feed line structure used in microwave and millimeter-wave applications. It combines the advantages of traditional waveguides, such as low loss and high power handling, with the integration benefits of planar transmission lines. In the substrate integrated waveguide type feed line structure, a waveguide-like structure is created by etching grooves or cavities into a dielectric substrate material, typically a high-permittivity substrate like ceramic or high-frequency laminate. The sidewalls of the cavities act as electrically conductive surfaces, forming the boundaries of the waveguide, while the dielectric substrate serves as the waveguide's bottom wall. This configuration allows for the confinement and propagation of electromagnetic waves within the substrate. The substrate integrated waveguide type feed line structure offers a planar, compact structure, making it suitable for integration with planar circuits and enabling miniaturization of components. The use of low-loss dielectric materials in substrate integrated waveguide type feed line structure results in minimal signal attenuation and low insertion loss, contributing to high efficiency and signal integrity.

Referring to FIG. 9, the feed line structure FLS in some embodiments includes a waveguide WG configured to guide electromagnetic waves along its path. The waveguide WG in some embodiments includes a first metallic layer ML1 on a side of the first low dielectric constant layer LDL1 away from the phase shifter PS, a substrate S on a side of the first metallic layer ML1 away from the first low dielectric constant layer LDL1, a second metallic layer ML2 on a side of the substrate S away from the first metallic layer ML1, and a plurality of metallic vias MV extending through the substrate S and connecting the first metallic layer ML1 and the second metallic layer ML2.

In some embodiments, the substrate S of the waveguide WG in the substrate integrated waveguide type feed line structure includes a low dielectric constant material. Various appropriate low dielectric constant materials may be used for making the substrate S of the waveguide WG in the substrate integrated waveguide type feed line structure. Examples of appropriate low dielectric constant materials for making the substrate S of the waveguide WG in the substrate integrated waveguide type feed line structure include polymethyl methacrylimide (PMI, having a dielectric constant in a range of 2 to 3), polytetrafluoroethylene (typically having a dielectric constant around 2.1), polyetheretherketone (typically having a dielectric constant in a range of 2.8 to 3.3), liquid crystal polymer (typically having a dielectric constant in a range of 2.8 to 3.2), polystyrene (typically having a dielectric constant in a range of 2.5 to 2.6), polyethylene (typically having a dielectric constant in a range of 2.2 to 2.4), low-density polyethylene (typically having a dielectric constant in a range of 1.9 to 2.3), and polytetrafluoroethylene (typically having a dielectric constant around 2.1). In one example, the low dielectric constant layers are made of polymethyl methacrylimide.

In some embodiments, the substrate S of the waveguide WG in the substrate integrated waveguide type feed line structure is a printed circuit board, e.g., Rogers 5880™ (Rogers Corporation).

For a liquid crystal phase shifter, regardless of whether a transmission line with periodically loaded variable capacitor structure or microstrip transmission line structure is used, after phase shifting the electromagnetic wave, it is necessary to transfer the energy to the feed line structure FLS. Due to the limitations of the liquid crystal process, coupling is usually used to achieve energy transfer.

In some embodiments, the waveguide WO further includes an aperture AP extending through the first metallic layer ML1, facilitating coupling between the phase shifter PS and the feed line structure FLS.

Figure 10:
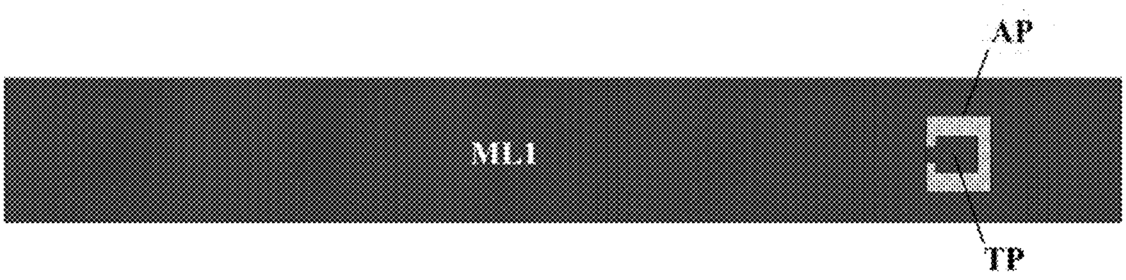
FIG. 10 is a plan view of a terminal portion of a first electrode of a phase shifter, a first metallic layer of a waveguide in a feed line structure, and an aperture extending through the first metallic layer in the waveguide in some embodiments according to the present disclosure.

FIG. 10 is a plan view of a terminal portion of a first electrode of a phase shifter, a first metallic layer of a waveguide in a feed line structure, and an aperture extending through the first metallic layer in the waveguide in some embodiments according to the present disclosure, Referring to FIG. 10, a first electrode of a phase shifter unit of the phase shifter in some embodiments includes a terminal portion TP. Optionally, an orthographic projection of the terminal portion TP on the substrate S at least partially overlaps with an orthographic projection of the aperture AP extending through the first metallic layer ML1 on the substrate S. The terminal portion TP is configured to transfer energy from the phase shifter to the feed line structure. The terminal portion TP functions as a probe, and may have various appropriate shapes. In one example depicted in FIG. 10, the terminal portion TP is a single probe. Optionally, an orthographic projection of the single probe on the substrate S at least partially overlaps with an orthographic projection of the aperture AP extending through the first metallic layer ML1 on the substrate S. In an alternative example, the terminal portion TP includes multiple probes. Optionally, an orthographic projection of the multiple probes on the substrate S at least partially overlaps with an orthographic projection of the aperture AP extending through the first metallic layer ML1 on the substrate S. In another alternative example, the terminal portion TP includes a dipole structure. Optionally, an orthographic projection of the dipole structure on the substrate S at least partially overlaps with an orthographic projection of the aperture AP extending through the first metallic layer ML1 on the substrate S.

Referring to FIG. 9 and FIG. 10, the first ground plate GP1 further facilitates the energy transfer from the phase shifter PS to the feed line structure FLS. For example, the first ground plate GP1 serves as an electrode layer, improving the directional coupling between the terminal portion TP and the feed line structure FLS, thereby achieving maximum coupling.

Figure 11:
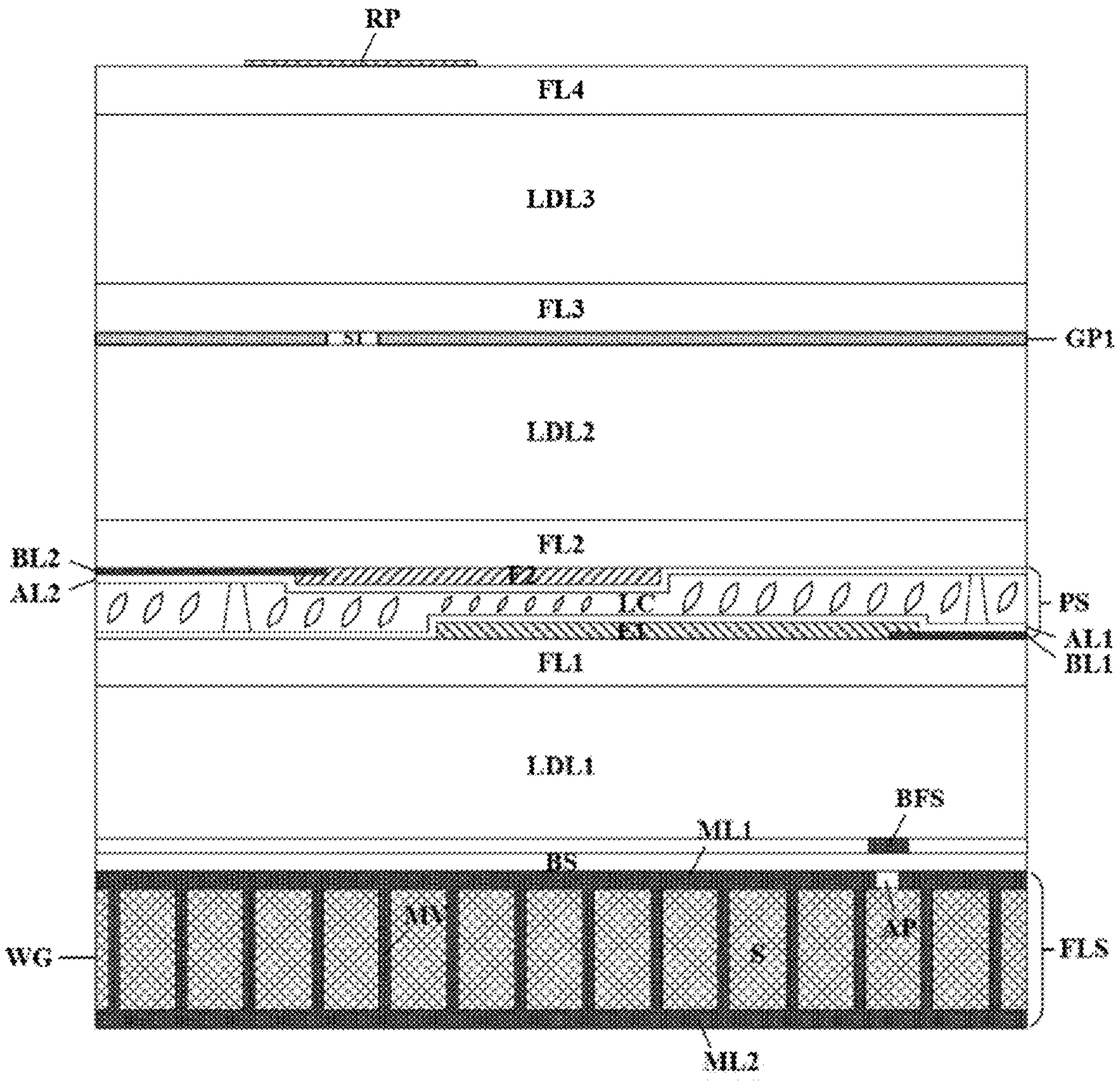
FIG. 11 is a diagram illustrating the structure of an antenna in some embodiments according to the present disclosure.
Figure 12A:
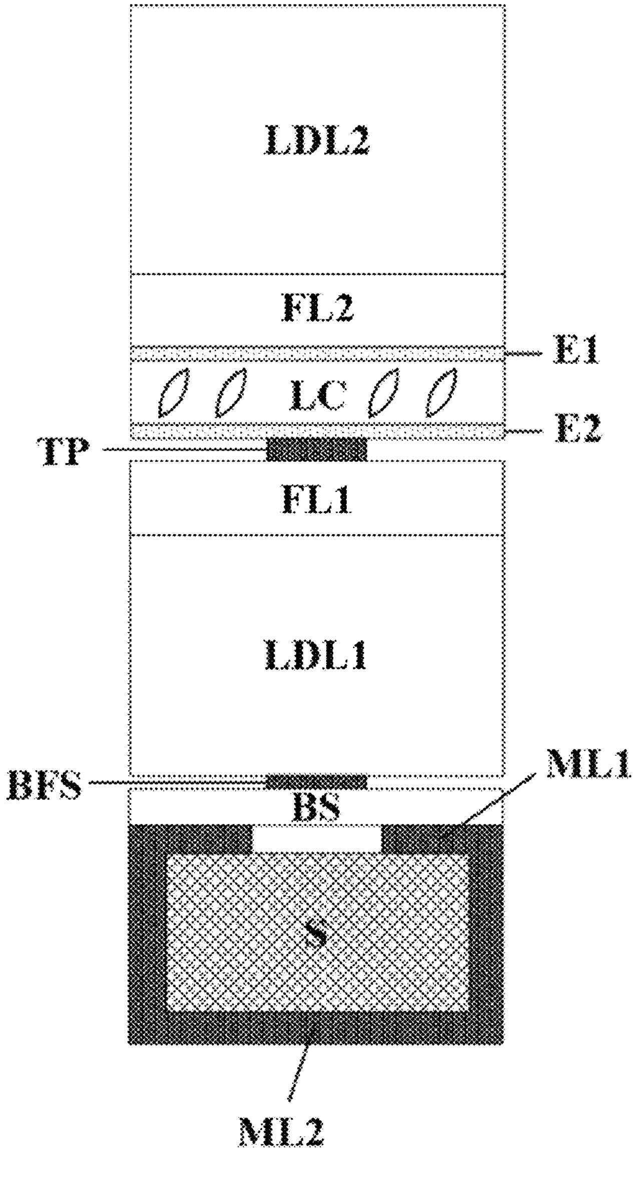
FIG. 12A is a cross-sectional view of a portion of an antenna having a beamforming structure in some embodiments according to the present disclosure.
Figure 12B:
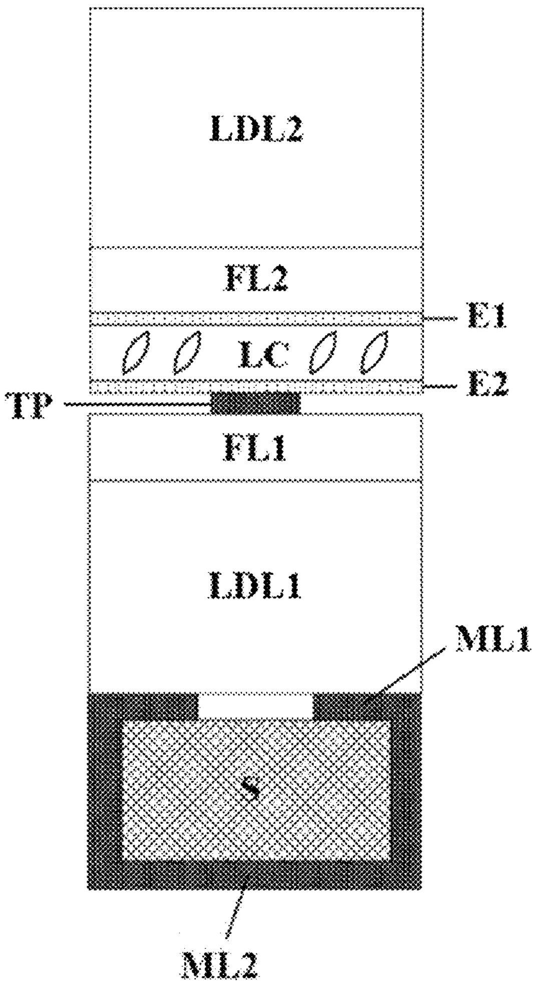
FIG. 12B is a cross-sectional view of a portion of an antenna without a beamforming structure in some embodiments according to the present disclosure.
Figure 13:
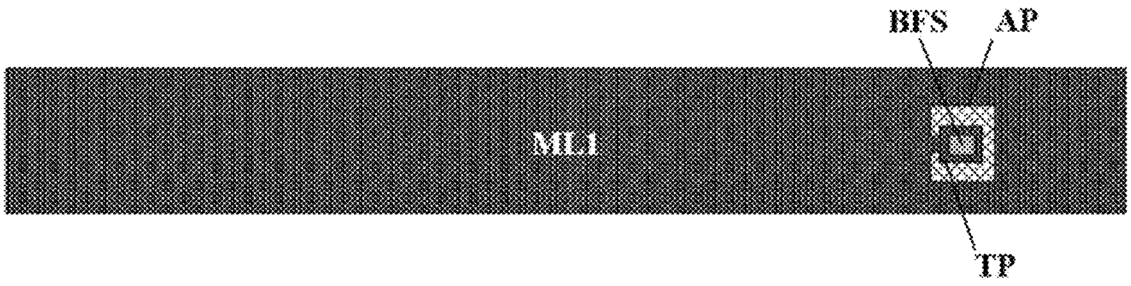
FIG. 13 is a plan view of a terminal portion of a first electrode of a phase shifter, a first metallic layer of a waveguide in a feed line structure, an aperture extending through the first metallic layer in the waveguide, and a beamforming structure in some embodiments according to the present disclosure.

FIG. 11 is a diagram illustrating the structure of an antenna in some embodiments according to the present disclosure. FIG. 12A is a cross-sectional view of a portion of an antenna having a beamforming structure in some embodiments according to the present disclosure. FIG. 12B is a cross-sectional view of a portion of an antenna without a beamforming structure in some embodiments according to the present disclosure. FIG. 13 is a plan view of a terminal portion of a first electrode of a phase shifter, a first metallic layer of a waveguide in a feed line structure, an aperture extending through the first metallic layer in the waveguide, and a beamforming structure in some embodiments according to the present disclosure, Referring to FIG. 11, FIG. 12A, FIG. 12B, and FIG. 13, the antenna in some embodiments includes a feed line structure FLS, a first low dielectric constant layer LDL1 on the feed line structure FLS, a first flexible layer FL1 on a side of the first low dielectric constant layer LDL1 away from the feed line structure FLS, a phase shifter PS on a side of the first flexible layer FL1 away from the first low dielectric constant layer LDL1, a first ground plate GP1 on a side of the phase shifter PS away from the first flexible layer FL1, and a radiating plate RP on a side of the first ground plate GP1 away from the phase shifter PS.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

In some embodiments, the antenna further includes a second flexible layer FL2 on a side of the phase shifter PS away from the first flexible layer FL1, a second low dielectric constant layer LDL2 on a side of the second flexible layer FL2 away from the phase shifter PS. The first ground plate GP1 is on a side of the second low dielectric constant layer LDL2 away from the second flexible layer FL2.

The inventors of the present disclosure discover that by having a second low dielectric constant layer LDL2, particularly a combination of a second flexible layer FL2 and the second low dielectric constant layer LDL2, between the phase shifter PS and the first ground plate GP1, the antenna of the present disclosure surprisingly and unexpectedly achieves low loss, resulting in higher efficiency and broader bandwidth.

In some embodiments, the antenna further includes a third flexible layer FL3 on a side of the first ground plate GP1 away from the phase shifter PS, a third low dielectric constant layer LDL3 on a side of the third flexible layer FL3 away from the first ground plate GP1, and a fourth flexible layer FL4 on a side of the third low dielectric constant layer LDL3 away from the third flexible layer FL3. The radiating plate RP is on a side of the fourth flexible layer FL4 away from the third low dielectric constant layer LDL3.

The inventors of the present disclosure discover that by having a third low dielectric constant layer LDL3, particularly a combination of a third flexible layer FL3, the third low dielectric constant layer LDL3, and optionally a fourth flexible layer FL4, between the first ground plate GP1 and the radiating plate RP, the antenna of the present disclosure surprisingly and unexpectedly achieves low loss, resulting in higher efficiency and broader bandwidth.

In some embodiments, the feed line structure FLS is a substrate integrated waveguide type feed line structure. In some embodiments, the feed line structure FLS includes a waveguide WG configured to guide electromagnetic waves along its path. The waveguide WG in some embodiments includes a first metallic layer ML1 on a side of the first low dielectric constant layer LDL1 away from the phase shifter PS, a substrate S on a side of the first metallic layer ML1 away from the first low dielectric constant layer LDL1, a second metallic layer ML2 on a side of the substrate S away from the first metallic layer ML1, and a plurality of metallic vias MV extending through the substrate S and connecting the first metallic layer ML1 and the second metallic layer ML2.

In some embodiments, the waveguide WG further includes an aperture AP extending through the first metallic layer ML1, facilitating coupling between the phase shifter PS and the feed line structure FLS.

In some embodiments, a first electrode of a phase shifter unit of the phase shifter includes a terminal portion TP. Optionally, an orthographic projection of the terminal portion TP on the substrate S at least partially overlaps with an orthographic projection of the aperture AP extending through the first metallic layer ML1 on the substrate S. The terminal portion TP is configured to transfer energy from the phase shifter to the feed line structure.

In some embodiments, the antenna further includes a beamforming structure BFS on a side of the first low dielectric constant layer LDL1 away from the phase shifter PS. The beamforming structure BFS is configured to further enhance the coupling efficiency between the phase shifter PS and the feed line structure FLS. The beamforming structure BFS and the terminal portion TP of the phase shifter PS in coordination achieves efficient and directional energy transfer between the phase shifter PS and the feed line structure FLS.

In some embodiments, an orthographic projection of the terminal portion TP on the substrate S at least partially overlaps with an orthographic projection of the beamforming structure BFS on the substrate S. Optionally, the orthographic projection of the terminal portion TP on the substrate S covers the orthographic projection of the beamforming structure BFS on the substrate S.

In some embodiments, an orthographic projection of the beamforming structure BFS on the substrate S at least partially overlaps with an orthographic projection of the aperture AP extending through the first metallic layer ML1 on the substrate S. Optionally, the orthographic projection of the aperture AP extending through the first metallic layer ML1 on the substrate S covers the orthographic projection of the beamforming structure BFS on the substrate S.

In some embodiments, the antenna further includes a base substrate BS. The beamforming structure BFS is on a side of the base substrate BS away from the aperture AP. Optionally, the beamforming structure BFS is in direct contact with the base substrate BS. Various appropriate insulating materials may be used for making the base substrate BS. Examples of appropriate insulating materials for making the base substrate BS include polytetrafluoroethylene (PTFE) glass fiber laminate, phenolic paper laminate, phenolic glass cloth laminate, or rigid materials with low microwave loss such as quartz or glass. In one example, a thickness of the base substrate BS is in a range of 100 μm to 1 mm.

Figure 14:
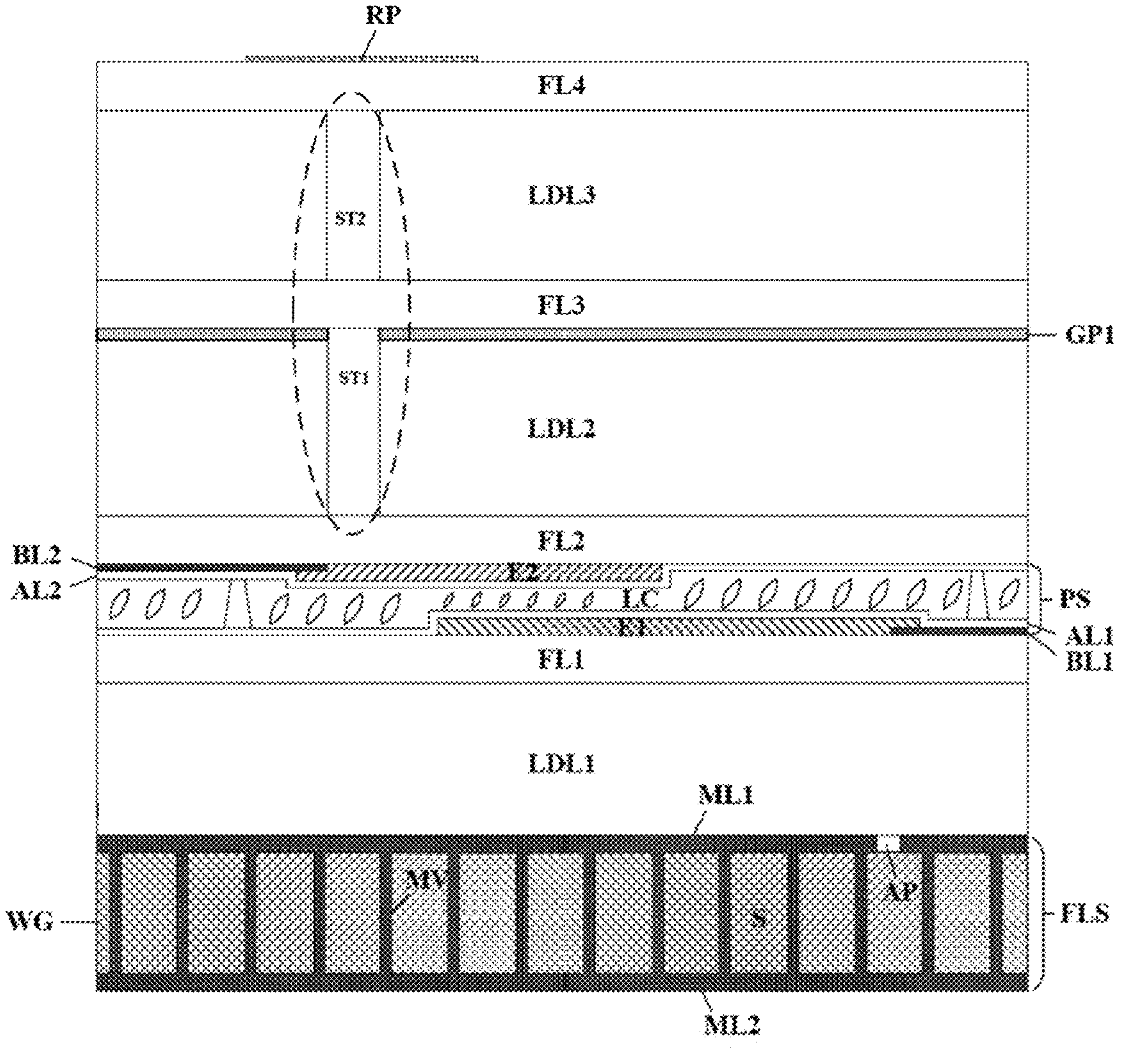
FIG. 14 is a diagram illustrating the structure of an antenna in some embodiments according to the present disclosure.

FIG. 14 is a diagram illustrating the structure of an antenna in some embodiments according to the present disclosure. Referring to FIG. 14, the antenna in some embodiments includes a feed line structure FLS, a first low dielectric constant layer LDL1 on the feed line structure FLS, a first flexible layer FL1 on a side of the first low dielectric constant layer LDL1 away from the feed line structure FLS, a phase shifter PS on a side of the first flexible layer FL1 away from the first low dielectric constant layer LDL1, a first ground plate GP1 on a side of the phase shifter PS away from the first flexible layer FL1, and a radiating plate RP on a side of the first ground plate GP1 away from the phase shifter PS.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

In some embodiments, the antenna further includes a second flexible layer FL2 on a side of the phase shifter PS away from the first flexible layer FL1, a second low dielectric constant layer LDL2 on a side of the second flexible layer FL2 away from the phase shifter PS. The first ground plate GP1 is on a side of the second low dielectric constant layer LDL2 away from the second flexible layer FL2.

The inventors of the present disclosure discover that by having a second low dielectric constant layer LDL2, particularly a combination of a second flexible layer FL2 and the second low dielectric constant layer LDL2, between the phase shifter PS and the first ground plate GP1, the antenna of the present disclosure surprisingly and unexpectedly achieves low loss, resulting in higher efficiency and broader bandwidth.

In some embodiments, the antenna further includes a third flexible layer FL3 on a side of the first ground plate GP1 away from the phase shifter PS, a third low dielectric constant layer LDL3 on a side of the third flexible layer FL3 away from the first ground plate GP1, and a fourth flexible layer FL4 on a side of the third low dielectric constant layer LDL3 away from the third flexible layer FL3. The radiating plate RP is on a side of the fourth flexible layer FL4 away from the third low dielectric constant layer LDL3.

The inventors of the present disclosure discover that by having a third low dielectric constant layer LDL3, particularly a combination of a third flexible layer FL3, the third low dielectric constant layer LDL3, and optionally a fourth flexible layer FL4, between the first ground plate GP1 and the radiating plate RP, the antenna of the present disclosure surprisingly and unexpectedly achieves low loss, resulting in higher efficiency and broader bandwidth.

In some embodiments, the feed line structure FLS is a substrate integrated waveguide type feed line structure. In some embodiments, the feed line structure FLS includes a waveguide WG configured to guide electromagnetic waves along its path. The waveguide WG in some embodiments includes a first metallic layer ML1 on a side of the first low dielectric constant layer LDL1 away from the phase shifter PS, a substrate S on a side of the first metallic layer ML1 away from the first low dielectric constant layer LDL1, a second metallic layer ML2 on a side of the substrate S away from the first metallic layer ML1, and a plurality of metallic vias MV extending through the substrate S and connecting the first metallic layer ML1 and the second metallic layer ML2.

In some embodiments, the waveguide WG further includes an aperture AP extending through the first metallic layer ML1, facilitating coupling between the phase shifter PS and the feed line structure FLS.

In some embodiments, a first electrode of a phase shifter unit of the phase shifter includes a terminal portion TP. Optionally, an orthographic projection of the terminal portion TP on the substrate S at least partially overlaps with an orthographic projection of the aperture AP extending through the first metallic layer ML1 on the substrate S. The terminal portion TP is configured to transfer energy from the phase shifter to the feed line structure.

In some embodiments, the antenna further includes a slot extending through at least one low dielectric constant layer. The inventors of the present disclosure discover that, by having the slot extending through at least one low dielectric constant layer, the antenna of the present disclosure surprisingly and unexpectedly achieves low loss, resulting in higher efficiency and broader bandwidth.

In some embodiments, the antenna further includes a first slot ST1 extending through the second low dielectric constant layer LDL2. Optionally, the first slot ST1 extends through the first ground plate GP1 and the second low dielectric constant layer LDL2. Optionally, an orthographic projection of the radiating plate RP on a base substrate at least partially overlaps with (e.g., covers) an orthographic projection of the first slot ST1 on the base substrate.

In some embodiments, the antenna further includes a second slot ST2 extending through the third low dielectric constant layer LDL3, Optionally, an orthographic projection of the radiating plate RP on a base substrate at least partially overlaps with (e.g., covers) an orthographic projection of the second slot ST2 on the base substrate. Optionally, the orthographic projection of the first slot ST1 on the base substrate at least partially overlaps with the orthographic projection of the second slot ST2 on the base substrate. Optionally, the first slot ST1 and the second slot ST2 are spaced apart by the third flexible layer FL3.

Figure 15:
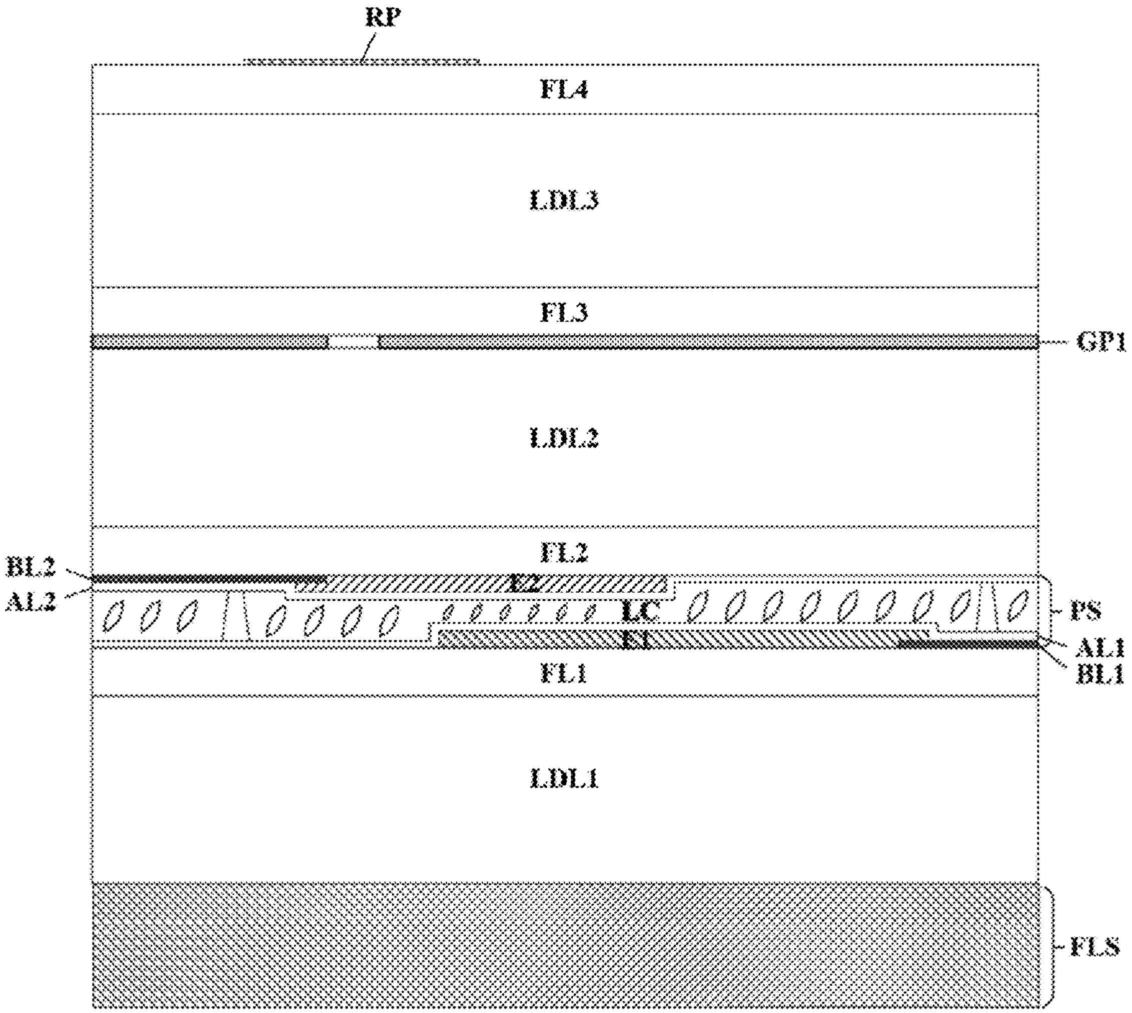
FIG. 15 is a diagram illustrating the structure of an antenna in some embodiments according to the present disclosure.

FIG. 15 is a diagram illustrating the structure of an antenna in some embodiments according to the present disclosure, Referring to FIG. 15, the antenna in some embodiments includes a feed line structure FLS, a first low dielectric constant layer LDL1 on the feed line structure FLS, a first flexible layer FL1 on a side of the first low dielectric constant layer LDL1 away from the feed line structure FLS, a phase shifter PS on a side of the first flexible layer FL1 away from the first low dielectric constant layer LDL1, a first ground plate GP1 on a side of the phase shifter PS away from the first flexible layer FL1, and a radiating plate RP on a side of the first ground plate GP1 away from the phase shifter PS.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

In some embodiments, the antenna further includes a second flexible layer FL2 on a side of the phase shifter PS away from the first flexible layer FL1, a second low dielectric constant layer LDL2 on a side of the second flexible layer FL2 away from the phase shifter PS. The first ground plate GP1 is on a side of the second low dielectric constant layer LDL2 away from the second flexible layer FL2.

The inventors of the present disclosure discover that by having a second low dielectric constant layer LDL2, particularly a combination of a second flexible layer FL2 and the second low dielectric constant layer LDL2, between the phase shifter PS and the first ground plate GP1, the antenna of the present disclosure surprisingly and unexpectedly achieves low loss, resulting in higher efficiency and broader bandwidth.

In some embodiments, the antenna further includes a third flexible layer FL3 on a side of the first ground plate GP1 away from the phase shifter PS, a third low dielectric constant layer LDL3 on a side of the third flexible layer FL3 away from the first ground plate GP1, and a fourth flexible layer FL4 on a side of the third low dielectric constant layer LDL3 away from the third flexible layer FL3. The radiating plate RP is on a side of the fourth flexible layer FL4 away from the third low dielectric constant layer LDL3.

The inventors of the present disclosure discover that by having a third low dielectric constant layer LDL3, particularly a combination of a third flexible layer FL3, the third low dielectric constant layer LDL3, and optionally a fourth flexible layer FL4, between the first ground plate GP1 and the radiating plate RP, the antenna of the present disclosure surprisingly and unexpectedly achieves low loss, resulting in higher efficiency and broader bandwidth.

In some embodiments, the feed line structure FLS is made of a metallic material. Various appropriate metallic materials may be used for making the feed line structure FLS. Examples of appropriate metallic materials for making the feed line structure FLS includes aluminum and various appropriate aluminum alloys. In one example, the feed line structure FLS is made of a light weight material. In another example, the feed line structure FLS is made of a plastic substrate with a metallic material on the surface of the plastic substrate. For example, the plastic substrate may be electroplated with a metallic material on its surface.

The inventors of the present disclosure discover that by having a first low dielectric constant layer LDL1, particularly a combination of a first flexible layer FL1 and the first low dielectric constant layer LDL1, between the phase shifter PS and the feed line structure FLS, the antenna of the present disclosure surprisingly and unexpectedly achieves low loss for the phase shifter PS, resulting in higher efficiency and broader bandwidth.

Various alternative implementations may be practiced in the present disclosure. In some embodiments, the antenna further includes an insertion probe configured to couple electromagnetic energy from the phase shifter to the waveguide. In some embodiments, the insertion probe inserts into the waveguide, facilitating establishing a coupling between the waveguide and the phase shifter. The insertion probe may have various appropriate shapes, including, for example, a simple metallic rod, a tapered structure, or a slot antenna, and so on. By carefully designing and optimizing the insertion probe, efficient energy transfer and coupling can be achieved between the waveguide and the phase shifter. This allows for effective control and manipulation of the electromagnetic waves, enabling the desired functionality and performance of the antenna.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An antenna, comprising:
a feed line structure;
a first low dielectric constant layer on the feed line structure;
a first flexible layer on a side of the first low dielectric constant layer away from the feed line structure;
a phase shifter on a side of the first flexible layer away from the first low dielectric constant layer;
a first ground plate on a side of the phase shifter away from the first flexible layer; and
a radiating plate on a side of the first ground plate away from the phase shifter;
wherein the first low dielectric constant layer has a dielectric constant in a range of 1.5 to 3; and
the first flexible layer has a Flexural modulus in a range of 0.01 to 10.0 GPa.

2. The antenna of claim 1, further comprising:
a second flexible layer on a side of the phase shifter away from the first flexible layer; and
a second low dielectric constant layer on a side of the second flexible layer away from the phase shifter;
wherein the first ground plate is on a side of the second low dielectric constant layer away from the second flexible layer;
the second low dielectric constant layer has a dielectric constant in a range of 1.5 to 3; and
the second flexible layer has a Flexural modulus in a range of 0.01 to 10.0 GPa.

3. The antenna of claim 1, further comprising:
a third flexible layer on a side of the first ground plate away from the phase shifter; and
a third low dielectric constant layer on a side of the third flexible layer away from the first ground plate;
wherein the radiating plate is on a side of the third low dielectric constant layer away from the third flexible layer;
the third low dielectric constant layer has a dielectric constant in a range of 1.5 to 3; and
the third flexible layer has a Flexural modulus in a range of 0.01 to 10.0 GPa.

4. The antenna of claim 3, further comprising a fourth flexible layer on a side of the third low dielectric constant layer away from the third flexible layer;
wherein the radiating plate is on a side of the fourth flexible layer away from the third low dielectric constant layer; and
the fourth flexible layer has a Flexural modulus in a range of 0.01 to 10.0 GPa.

5. The antenna of claim 1, further comprising:
a second ground plate on a side of the feed line structure away from the phase shifter;
a fourth low dielectric constant layer on a side of the second ground plate away from the feed line structure; and
a fifth flexible layer on a side of the fourth low dielectric constant layer away from the second ground plate;
wherein the fourth low dielectric constant layer has a dielectric constant in a range of 1.5 to 3; and
the fifth flexible layer has a Flexural modulus in a range of 0.01 to 10.0 GPa.

6. The antenna of claim 5, further comprising a sixth flexible layer on a side of the second ground plate away from the feed line structure;

wherein the sixth flexible layer has a Flexural modulus in a range of 0.01 to 10.0 GPa.

7. The antenna of claim 1, further comprising:

a second ground plate on a side of the feed line structure away from the phase shifter; and an air layer and a spacer layer between the second ground plate and the feed line structure;

wherein the air layer comprises a low dielectric constant gas; and the spacer layer comprises one or more spacers spacing apart the second ground plate and the feed line structure.

8. The antenna of claim 7, further comprising:

a fifth flexible layer on a side of the feed line structure away from the second ground plate;

a sixth flexible layer on a side of the second ground plate away from the feed line structure; and a fourth low dielectric constant layer on a side of the sixth flexible layer away from the second ground plate;

wherein the fourth low dielectric constant layer has a dielectric constant in a range of 1.5 to 3;

the fifth flexible layer has a Flexural modulus in a range of 0.01 to 10.0 GPa; and the sixth flexible layer has a Flexural modulus in a range of 0.01 to 10.0 GPa.

9. The antenna of claim 1, further comprising:

a printed circuit board on a side of the feed line structure away from the phase shifter; and a second ground plate on a side of the printed circuit board away from the feed line structure;

wherein the printed circuit board has a dielectric constant in a range of 1.5 to 3; and a thickness of the printed circuit board is in a range of 1 mm to ¼ of a dielectric wavelength of the printed circuit board.

10. The antenna of claim 1, wherein the feed line structure is a substrate integrated waveguide type feed line structure;

wherein the feed line structure comprises a waveguide;

the waveguide comprises a first metallic layer on a side of the first low dielectric constant layer away from the phase shifter, a substrate on a side of the first metallic layer away from the first low dielectric constant layer, a second metallic layer on a side of the substrate away from the first metallic layer, and a plurality of metallic vias extending through the substrate and connecting the first metallic layer and the second metallic layer; and the substrate has a dielectric constant in a range of 1.5 to 3.

11. The antenna of claim 10, wherein the waveguide further comprises an aperture extending through the first metallic layer;

the phase shifter comprises a terminal portion;

an orthographic projection of the terminal portion on the substrate at least partially overlaps with an orthographic projection of the aperture on the substrate; and the terminal portion is configured to transfer energy from the phase shifter to the feed line structure.

12. The antenna of claim 11, further comprising a beamforming structure on a side of the first low dielectric constant layer away from the phase shifter;

wherein an orthographic projection of the terminal portion on the substrate at least partially overlaps with an orthographic projection of the beamforming structure on the substrate; and the orthographic projection of the beamforming structure on the substrate at least partially overlaps with the orthographic projection of the aperture on the substrate.

13. The antenna of claim 12, further comprising a base substrate;

wherein the beamforming structure is on a side of the base substrate away from the aperture.

14. The antenna of claim 1, further comprising a slot extending through at least one low dielectric constant layer.

15. The antenna of claim 2, further comprising a first slot extending through the second low dielectric constant layer and the first ground plate;

wherein an orthographic projection of the radiating plate on a base substrate at least partially overlaps with an orthographic projection of the first slot on the base substrate.

16. The antenna of claim 3, further comprising a second slot extending through the third low dielectric constant layer;

wherein an orthographic projection of the radiating plate on a base substrate at least partially overlaps with an orthographic projection of the second slot on the base substrate.

17. The antenna of claim 1, further comprising:

a second low dielectric constant layer on a side of the phase shifter away from the feed line structure;

a third low dielectric constant layer on a side of the first ground plate away from the second low dielectric constant layer;

a first slot extending through the second low dielectric constant layer and the first ground plate; and a second slot extending through the third low dielectric constant layer;

wherein an orthographic projection of the first slot on a base substrate at least partially overlaps with the orthographic projection of the second slot on the base substrate; and an orthographic projection of the radiating plate on the base substrate at least partially overlaps with the orthographic projection of the first slot on the base substrate, and at least partially overlaps with the orthographic projection of the second slot on the base substrate.

18. The antenna of claim 17, further comprising a third flexible layer on a side of the first ground plate away from the phase shifter;

wherein the first slot and the second slot are spaced apart by the third flexible layer.

19. The antenna of claim 1, wherein the feed line structure is made of a plastic substrate with a metallic material on a surface of the plastic substrate.

20. The antenna of claim 1, wherein the phase shifter comprises a plurality of phase shifter units;

a respective phase shifter unit comprises:

a first electrode;

a liquid crystal layer on the first electrode;

a second electrode on a side of the liquid crystal layer away from the first electrode;

a storage capacitor connected to the first electrode and/or the second electrode; and a ratio of a first resistivity of capacitor electrodes of the storage capacitor to a second resistivity of the first electrode and/or the second electrode is greater than 2.

* * * * *